US 8,948,114 B2

(12) United States Patent
Kishigami et al.

(10) Patent No.: US 8,948,114 B2
(45) Date of Patent: *Feb. 3, 2015

(54) TRANSMISSION APPARATUS AND TRANSMISSION METHOD USING A PLURALITY OF DIVIDED FREQUENCY BANDS IN A COMMUNICATION BAND

(71) Applicant: Panasonic Corporation, Osaka (JP)

(72) Inventors: Takaaki Kishigami, Tokyo (JP); Yoichi Nakagawa, Tokyo (JP); Kentaro Miyano, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 13/683,785

(22) Filed: Nov. 21, 2012

(65) Prior Publication Data

US 2013/0083760 A1 Apr. 4, 2013

Related U.S. Application Data

(63) Continuation of application No. 13/185,012, filed on Jul. 18, 2011, now Pat. No. 8,379,620, which is a continuation of application No. 12/944,552, filed on Nov. 11, 2010, now Pat. No. 8,009,656, which is a (Continued)

(30) Foreign Application Priority Data

Jul. 28, 2003 (JP) .................................. 2003-280557
Jul. 21, 2004 (JP) .................................. 2004-213588

(51) Int. Cl.
*H04W 4/00* (2009.01)
*H04W 72/04* (2009.01)
(Continued)

(52) U.S. Cl.
CPC ............... *H04W 72/042* (2013.01); *H04B 7/01* (2013.01); *H04L 5/0028* (2013.01);
(Continued)

(58) Field of Classification Search
CPC ............ H04W 28/00; H04W 28/0247; H04W 28/0268; H04W 72/04; H04W 72/02; H04W 72/044; H04W 72/042; H04W 74/00; H04W 84/00; H04W 84/08
USPC .................. 370/310, 314, 328, 329, 341, 431
See application file for complete search history.

(56) References Cited

U.S. PATENT DOCUMENTS 5,530,655 A 6/1996 Lokhoff et al.
5,625,880 A * 4/1997 Goldburg et al. ............ 340/7.22

(Continued)

FOREIGN PATENT DOCUMENTS

EP 1 185 001 A2 3/2002
JP 2002-246958 A 8/2002

(Continued)

OTHER PUBLICATIONS

Bolcskei et al., "On the Capacity of OFDM-Based Spatial Multiplexing Systems," IEEE Transactions on Communications 50(2):225-234, Feb. 2002.

(Continued)

*Primary Examiner* — Anh Ngoc Nguyen
(74) *Attorney, Agent, or Firm* — Seed IP Law Group PLLC

(57) ABSTRACT

A radio communication apparatus capable of alleviating a burden in setting a transmission format and suppressing increases in the scale of the apparatus. In this apparatus, space multiplexing adaptability detection section (108) detects space multiplexing transmission adaptability for divided bands (DB-1 to DB-Nd) obtained by dividing a communication band to which Ns subcarrier signals belong in multicarrier transmission and to which a plurality of subcarrier signals belong, and outputs the detection results (#1 to #Nd). Transmission format setting section (110) sets a transmission format when carrying out radio transmission based on the detection results (#1 to #Nd) from space multiplexing adaptability detection section (108).

7 Claims, 12 Drawing Sheets

Related U.S. Application Data continuation of application No. 12/543,375, filed on Aug. 18, 2009, now Pat. No. 7,860,051, which is a continuation of application No. 10/565,845, filed as application No. PCT/JP2004/010632 on Jul. 26, 2004, now Pat. No. 7,751,369.

(51) Int. Cl.
*H04B 7/01* (2006.01)
*H04L 5/00* (2006.01)
*H04W 72/08* (2009.01)

(52) U.S. Cl.
CPC ........... *H04L 5/0037* (2013.01); *H04L 5/0044* (2013.01); *H04L 5/0051* (2013.01); *H04L 5/006* (2013.01); *H04W 72/085* (2013.01); *H04L 5/0023* (2013.01); *H04L 5/0026* (2013.01)
USPC ........................................................ 370/329

(56) References Cited

U.S. PATENT DOCUMENTS

| | | |
|---|---|---|
| 5,828,658 A | 10/1998 | Ottersten et al. |
| 5,914,933 A | 6/1999 | Cimini et al. |
| 6,067,290 A | 5/2000 | Paulraj et al. |
| 6,088,592 A | 7/2000 | Doner et al. |
| 6,144,711 A | 11/2000 | Raleigh et al. |
| 6,351,499 B1 | 2/2002 | Paulraj et al. |
| 6,377,566 B1 | 4/2002 | Cupo et al. |
| 6,661,351 B1 | 12/2003 | Matsushiro |
| 6,870,808 B1 | 3/2005 | Liu et al. |
| 6,922,445 B1 | 7/2005 | Sampath et al. |
| 6,927,728 B2 | 8/2005 | Vook et al. |
| 6,947,748 B2 | 9/2005 | Li et al. |
| 6,985,434 B2 | 1/2006 | Wu et al. |
| 6,999,467 B2 | 2/2006 | Krauss et al. |
| 7,027,523 B2 | 4/2006 | Jalali et al. |
| 7,069,009 B2 | 6/2006 | Li et al. |
| 7,126,996 B2 | 10/2006 | Classon et al. |
| 7,130,592 B2 | 10/2006 | Ishikawa |
| 7,203,508 B2 | 4/2007 | Ohkubo et al. |
| 7,233,625 B2 | 6/2007 | Ma et al. |
| 7,286,540 B2 | 10/2007 | Kim et al. |
| 7,420,915 B2 | 9/2008 | Murakami et al. |
| 7,573,805 B2 | 8/2009 | Zhuang et al. |
| 7,751,369 B2 | 7/2010 | Kishigami et al. |
| 7,860,051 B2 | 12/2010 | Kishigami et al. |
| 8,009,656 B2 | 8/2011 | Kishigami et al. |
| 2001/0013091 A1 | 8/2001 | Koschella et al. |
| 2001/0014091 A1 | 8/2001 | Yamada et al. |
| 2002/0122383 A1 | 9/2002 | Wu et al. |
| 2002/0191535 A1 | 12/2002 | Sugiyama et al. |
| 2003/0060165 A1 | 3/2003 | Horisaki |
| 2003/0169722 A1* | 9/2003 | Petrus et al. .................. 370/347 |
| 2004/0022205 A1 | 2/2004 | Miyata et al. |
| 2004/0037262 A1 | 2/2004 | Tanada |
| 2004/0076172 A1 | 4/2004 | Sano |
| 2004/0082356 A1 | 4/2004 | Walton et al. |
| 2004/0192218 A1 | 9/2004 | Oprea |
| 2007/0177681 A1 | 8/2007 | Choi et al. |

FOREIGN PATENT DOCUMENTS

| | | |
|---|---|---|
| JP | 2002-374224 A | 12/2002 |
| JP | 2003-69531 A | 3/2003 |
| JP | 2003-110517 A | 4/2003 |
| JP | 2003-158499 A | 5/2003 |
| JP | 2003-169036 A | 6/2003 |

OTHER PUBLICATIONS

Foschini, "Layered Space-Time Architecture for Wireless Communication in a Fading Environment When Using Multi-Element Antennas," Bell Labs Technical Journal: 41-59, Autumn 1996.

International Search Report, dated Nov. 9, 2004, for International Application No. PCT/JP2004/010632, 2 pages.

Jing et al., "Performance Study of Adaptive Modulation/Coding in MIMO-OFDM System," CCGEI 2003, Montreal, CA, pp. 1559-1562.

Ohgane et al., "A Study on a Channel Allocation Scheme with an Adaptive Array in SDMA," IEEE 47th VTC, vol. 2, 1997, pp. 725-729.

Extended European Search Report, dated Oct. 2, 2012, for European Application No. 12179868.0-2415, 9 pages.

LG Electronics, Inc., "Multi-Stream Beamforming (MSB) MIMO System," R1-030581, Agenda Item: 6. MIMO, 3GPP TSG RAN WG1 #32, Paris, France, May 19-23, 2003, 10 pages.

* cited by examiner

TRANSMISSION APPARATUS AND TRANSMISSION METHOD USING A PLURALITY OF DIVIDED FREQUENCY BANDS IN A COMMUNICATION BAND

CROSS-REFERENCE(S) TO RELATED APPLICATION(S)

This is a continuation application of application Ser. No. 13/185,012 filed Jul. 18, 2011, which is a continuation of application Ser. No. 12/944,552 filed Nov. 11, 2010, which is a continuation application of application Ser. No. 12/543,375 filed Aug. 18, 2009, which is a continuation of application Ser. No. 10/565,845 filed Jan. 26, 2006, which is a national phase under 35 USC 371 of PCT/JP2004/010632 filed Jul. 26, 2004, which is based on Japanese Patent Application No. 2003-280557 filed on Jul. 28, 2003, and Japanese Patent Application No. 2004-213588 filed on Jul. 21, 2004, the entire contents of each of which are incorporated by reference herein.

BACKGROUND

1. Technical Field

The present invention relates to a radio communication apparatus and radio communication method used for a digital radio communication system which employs a multicarrier scheme.

2. Description of the Related Art

In recent years, there are increasing demands for capacity and speed enhancement of radio communication, and researches on methods for improving effective utilization of limited frequency resources have been actively conducted. As one of the methods, a technique utilizing spatial areas is attracting attention. One such representative method is a technique whereby spatial orthogonality in propagation paths is utilized and different data sequences are transmitted using physical channels of the same code at the same time instant and at the same frequency. Examples of such a transmission technique include Space Division Multiple Access (SDMA) (e.g., see Non-Patent Document 1) whereby different data sequences are transmitted to different mobile stations, and a Space Multiplexing (SM) (e.g., see Non-Patent Document 2) whereby different data are transmitted to the same mobile station.

In the above described SM, an apparatus on the transmitting side transmits different data sequences from a plurality of antennas provided on the apparatus on the transmitting side at the same time instant, at the same frequency and using physical channels of the same code for each antenna, while an apparatus on the receiving side separates signals received through a plurality of antennas provided on the apparatus on the receiving side into different data sequences based on a channel matrix indicating a propagation path characteristic between the transmission/reception antennas (hereinafter referred to as "BLAST type") and thereby enables the efficiency of frequency utilization to be improved. When SM transmission is carried out, it is possible to expand the communication capacity in proportion to the number of antennas if the apparatus on the transmitting side and the apparatus on the receiving side are provided with the same number of antennas in an environment in which there are many scatterers between the apparatuses on the transmitting and receiving sides under a sufficient S/N (signal power to noise power ratio).

Furthermore, in realizing considerable increases in capacity and speed enhancement of radio communication, it is important to improve tolerance to multipath or fading. A multicarrier transmission scheme is one approach to realize this and in particular an orthogonal frequency division multiplexing (OFDM) transmission scheme is adopted for terrestrial digital broadcasting and wideband radio access systems.

One example of a transmission scheme in which SM transmission is applied to this OFDM transmission is described in Non-Patent Document 3. Under this transmission scheme, when there is no multipath that exceeds the length of a guard interval, each subcarrier can be regarded as narrow band transmission, that is, flat fading transmission. For this reason, many examples have been reported where a channel matrix is calculated for each subcarrier and SM transmission is carried out based on the calculated channel matrix H.

Non-patent Document 1: "A Study on a Channel Allocation scheme with an Adaptive Array in SDMA", Ohgane, T., et al., IEEE 47th VTC, pp. 725-729, vol. 2, 1997

Non-patent Document 2: "Layered Space-Time Architecture for Wireless Communication in a fading environment when using multi-element antennas", Foschini, G. J., Bell Labs Tech. J, pp. 41-59, Autumn 1996

Non-Patent Document 3: "On the Capacity of OFDM-based Spatial Multiplexing Systems", IEEE Trans. Communications, vol. 50, pp. 225-234, 2002

DISCLOSURE OF INVENTION

Problems to be Solved by the Invention

However, the conventional radio communication system needs to calculate a channel matrix for each subcarrier and set a transmission format such as a space multiplexing number to be used for space multiplexing, a modulation scheme, an M-ary modulation number and a coding rate for each subcarrier, and since the amount of processing increases as the number of subcarriers increases, burdens are imposed on a radio communication apparatus setting the transmission format and the scale of the apparatus is increased.

It is an object of the present invention to provide a radio communication apparatus and radio communication method capable of reducing a burden when setting a transmission format and suppressing increases in the scale of the apparatus.

Means for Solving the Problem

The radio communication apparatus according to the present invention is a radio communication apparatus that carries out radio transmission by applying a multicarrier scheme to space multiplexing transmission, including a detection section that detects adaptability to space multiplexing transmission for each divided band obtained by dividing a communication band of multicarrier transmission and to which a plurality of subcarrier signals belong; and a setting section that sets a transmission format to be used to carry out radio transmission based on the adaptability detected for each divided band.

The radio communication method according to the present invention is a radio communication method for a radio communication apparatus that carries out radio transmission by applying a multicarrier scheme to space multiplexing transmission, including a detection step of detecting adaptability to space multiplexing transmission for each divided band obtained by dividing a communication band of multicarrier transmission and to which a plurality of subcarrier signals belong; and a setting step of setting a transmission format used to carry out radio transmission based on the adaptability detected for each divided band.

Advantageous Effect of the Invention

According to the present invention, it is possible to reduce a burden when setting a transmission format and suppress increases in the scale of the apparatus.

BEST MODE FOR CARRYING OUT THE INVENTION

Now, embodiments of the present invention will be explained in detail with reference to the attached drawings.

All the following embodiments will explain cases where a transmission format is set in a transmission signal from a base station apparatus to a mobile station apparatus (hereinafter referred to as "downlink").

Embodiment 1

Figure 1:
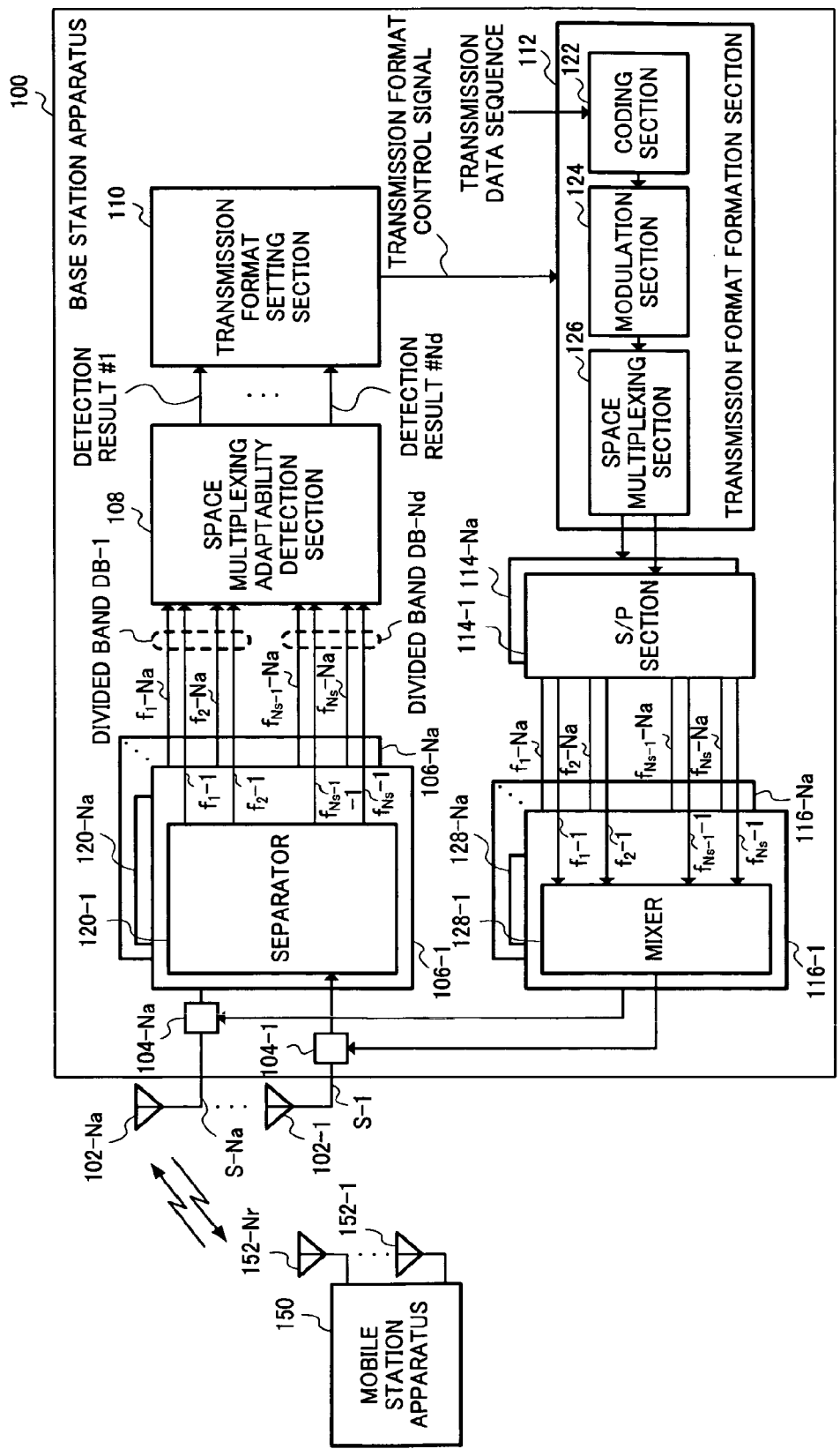
FIG. 1 is a block diagram showing the configuration of a base station apparatus according to Embodiment 1 of the present invention.

FIG. 1 is a block diagram showing the configuration of a base station apparatus according to Embodiment 1 of the present invention. This embodiment will explain a case with a radio communication system based on a TDD (Time Division Duplex) scheme. Furthermore, this embodiment will explain a case where space multiplexing adaptability is detected based on a reception result at the base station apparatus of a transmission signal from a mobile station apparatus to the base station apparatus (hereinafter referred to as "uplink") as an example.

Base station apparatus 100 shown in FIG. 1 includes Na antennas 102-1 to 102-Na, Na duplexers 104-1 to 104-Na, Na reception system antenna element sections 106-1 to 106-Na, space multiplexing adaptability detection section 108, transmission format setting section 110, transmission format formation section 112, Na serial/parallel conversion (S/P) sections 114-1 to 114-Na and Na transmission system antenna element sections 116-1 to 116-Na.

Furthermore, reception system antenna element sections 106-1 to 106-Na include separators 120-1 to 120-Na respectively. Transmission format formation section 112 includes coding section 122, modulation section 124 and space multiplexing section 126. Transmission system antenna element sections 116-1 to 116-Na include mixers 128-1 to 128-Na respectively.

Furthermore, SM-capable mobile station apparatus 150 that carries out a radio communication with base station apparatus 100 includes Nr antennas 152-1 to 152-Nr.

Antennas 102-1 to 102-Na are antennas in common with transmission and reception systems. Duplexers 104-1 to 104-Na output high-frequency signals S-1 to S-Na received through antennas 102-1 to 102-Na to separators 120-1 to 120-Na and wirelessly transmits high-frequency signals S-1 to S-Na input from mixers 128-1 to 128-Na via antennas 102-1 to 102-Na.

Separator 120-$k$ ($k$=1 to Na) applies processing such as high-frequency amplification and frequency conversion to high-frequency signal S-$k$ input from duplexer 104-$k$, then demultiplexes the signal into Ns subcarrier signals $f_1$-$k$ to $f_{Ns}$-$k$ and outputs the subcarrier signals to space multiplexing adaptability detection section 108.

Space multiplexing adaptability detection section 108 detects space multiplexing adaptability, that is, adaptability to space multiplexing transmission for each of Nd divided bands DB-1 to DB-Nd obtained by dividing a communication band to which Ns subcarrier signals $f_1$-$k$ to $f_{Ns}$-$k$ belong into Nd portions (Nd is a natural number: Ns>Nd≥1) and outputs detection results #1 to #Nd to transmission format setting section 110.

Figure 2:
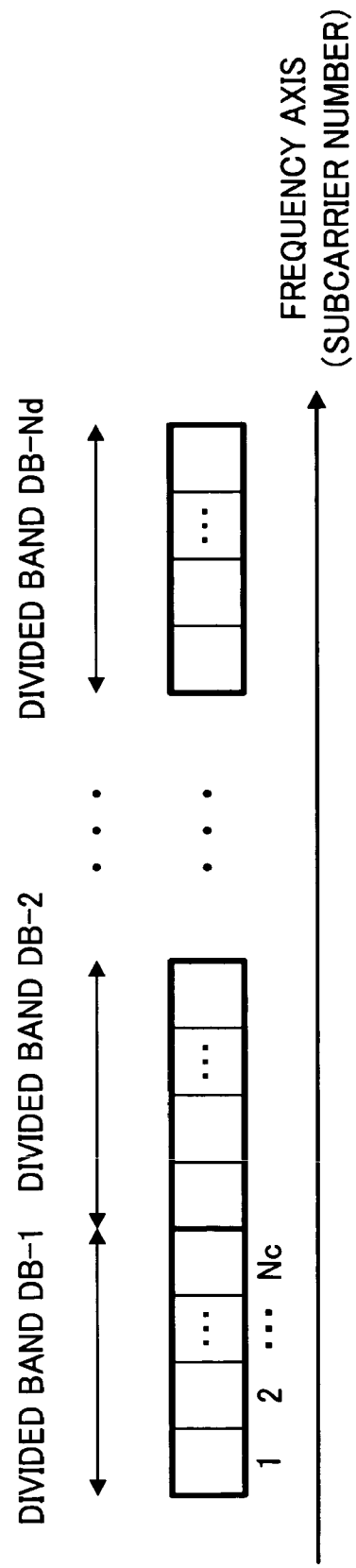
FIG. 2 illustrates a relationship between a divided band and subcarrier signal according to Embodiment 1 of the present invention.

The number of subcarrier signals which belong to respective divided bands DB-1 to DB-Nd need not always be equal, but it is assumed that, in this embodiment explained below, Nc (Nc=Ns/Nd) subcarrier signals uniformly belong to respective divided bands DB-1 to DB-Nd. The relationship between the divided bands and subcarrier signals is as shown in FIG. 2 and Nc subcarrier signals exist in divided bands. On the other hand, when the number of subcarrier signals which belong to the respective divided bands are different, the number of subcarrier signals which belong to the mth divided band DB-k is expressed as Nc(m) and satisfies the relationship in following (Equation 1).

$$Ns = \sum_{m=1}^{Nd} Nc(m) \quad \text{[Equation 1]}$$

Figure 3:
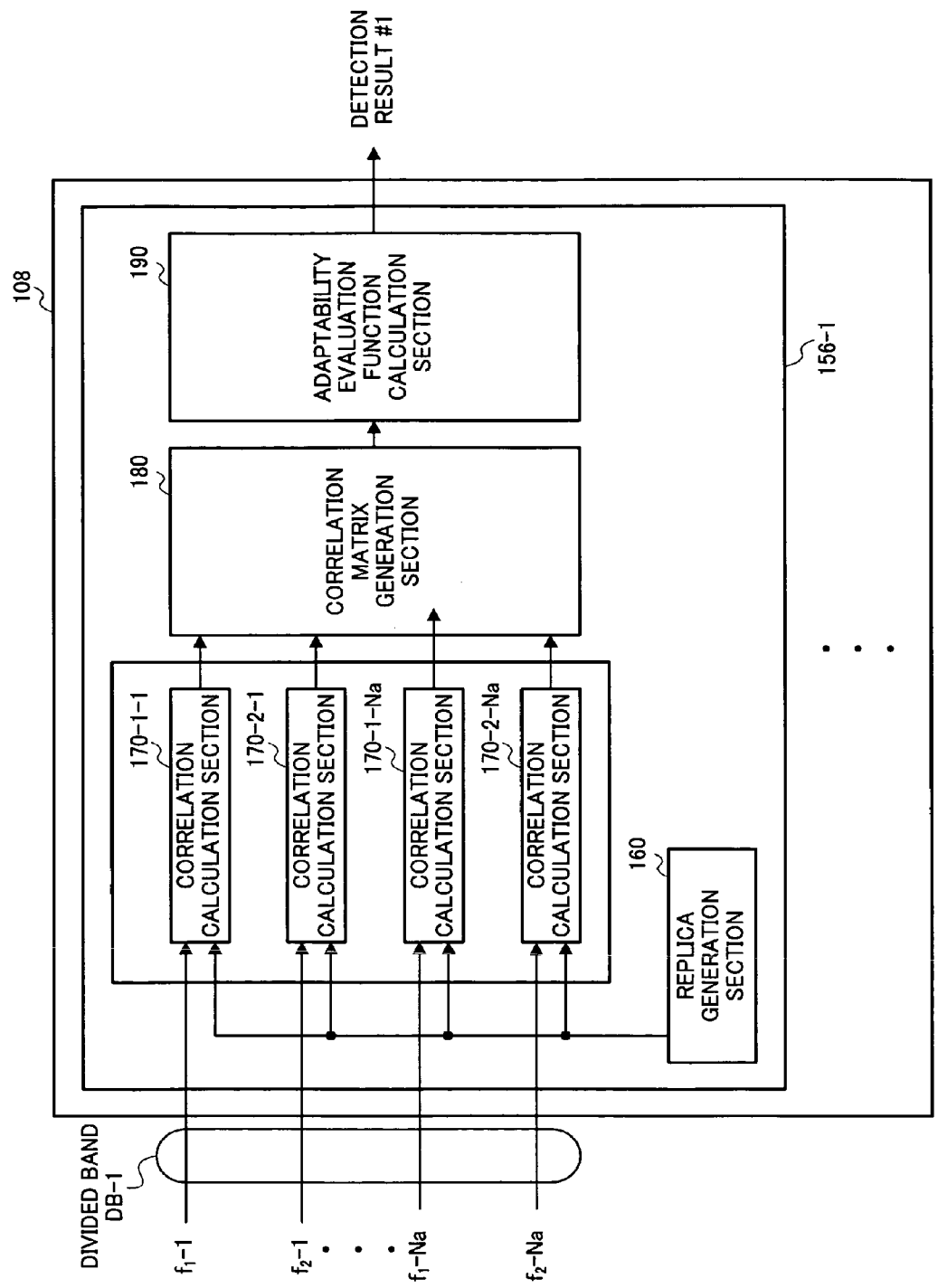
FIG. 3 is a block diagram showing main components of the configuration of a space multiplexing adaptability detection section according to Embodiment 1 of the present invention.

Here, the internal configuration of space multiplexing adaptability detection section 108 will be explained using FIG. 3. Space multiplexing adaptability detection section 108 includes Nd divided band processing sections 156-1 to 156-Nd corresponding to divided band DB-m (m=1 to Nd). However, FIG. 3 only shows the configuration of divided band processing section 156-1 that performs processing on divided band DB-1 for convenience of explanation. The configurations of the remaining divided band processing sections 156-2 to 156-Nd are similar to the configuration of divided band processing section 156-1, and therefore explanations thereof will be omitted. FIG. 3 takes a case where the number of subcarrier signals which belong to one divided band is 2 for example and subcarrier signals $f_1$-k, $f_2$-k belong to divided band DB-1.

Divided band processing section 156-$m$ includes replica generation section 160 that generates replicas of pilot signals which are known signals embedded in their respective subcarrier signals $f_{n(m)}$-1 to $f_{n(m)}$-Na, correlation calculation sections 170-$n$-1 to 170-$n$-Na (n=1 to Nc) that calculate correlation values between reception pilot symbols, which are included in the respective subcarrier signals $f_{n(m)}$-1 to $f_{n(m)}$-Na, and generated replicas, correlation matrix generation section 180 that generates a correlation matrix based on the calculated correlation values, and adaptability evaluation function calculation section 190 that calculates an adaptability evaluation function for evaluating adaptability to space multiplexing transmission based on the correlation matrix generated. Here, n(m) denotes a subcarrier signal number which belongs to divided band DB-m.

Note that divided band processing section 156-$m$ need not use all subcarrier signals $f_{n(m)}$-1 to $f_{n(m)}$-Na which belong to divided band DB-m. For example, it is possible to puncture some of subcarrier signal $f_{n(m)}$-1 to $f_{n(m)}$-Na and then carry out processing on divided band DB-m. When the subcarrier signals are punctured, it is difficult to improve the detection accuracy of adaptability to space multiplexing transmission but it is possible to obtain the effect of reducing the amount of processing calculation.

Correlation calculation section 170-$n$-$k$ carries out correlation calculations to calculate correlation values between the generated replicas and the reception pilot symbols included in subcarrier signals $f_{n(m)}$-1 to $f_{n(m)}$-Na. Assuming here that a pilot signal is r(s) (s=1 to Np, Np is the number of pilot signal symbols), correlation calculation section 170-$n$-$k$ calculates correlation value $h_{nk}$ by carrying out a correlation calculation shown in (Equation 2), where No denotes an oversampling number corresponding to a symbol and "*" denotes a complex conjugate transposition operator.

$$h_{nk} = \frac{1}{Np} \sum_{s=1}^{Np} f_{n-k}(t_0 + No \cdot (s-1)) r^*(s) \quad \text{[Equation 2]}$$

Correlation matrix generation section 180 generates correlation matrix R shown in (Equation 4) using a column vector, that is, correlation vector Vn calculated for subcarriers according to (Equation 3) based on calculated correlation value $h_{nk}$, where n=1 to Nc, k=1 to Na, T denotes a vector transposition operator and H denotes a complex conjugate transposition operator.

$$V_n = [\, h_{n,1} \quad h_{n,2} \quad \ldots \quad h_{n,Na} \,]^T \quad \text{[Equation 3]}$$

$$R = \frac{1}{Nc} \sum_{n=1}^{Nc} V_n V_n^H \quad \text{[Equation 4]}$$

That is, when correlation matrix R is generated, as shown in (Equation 4) above, correlation matrix ($V_n V_n^H$) (hereinafter referred to as "auto-correlation") is calculated from correlation vector Vn. Furthermore, correlation matrix R is obtained by integrating auto-correlations. In this embodiment, the auto-correlations are integrated by summing up the auto-correlations associated with the respective subcarrier signals. By so doing, it is possible to emphasize components corresponding to subcarrier signals in higher quality reception states more and improve the accuracy of setting a transmission format.

Adaptability evaluation function calculation section 190 performs eigenvalue expansion of generated correlation matrix R and determines Na eigenvalues $\lambda_k$. Furthermore, calculated eigenvalues $\lambda_k$ are sorted in descending order and subscripts are assigned from the maximum eigenvalue. Adaptability evaluation function values A and B shown in (Equation 5) and (Equation 6) are generated and detection results #m including them are output as space multiplexing adaptability of divided band DB-m. Obtaining space multiplexing adaptability including a plurality of function values from calculated eigenvalue $\lambda_k$ makes it possible to provide a plurality of indices to decide whether or not they are suitable for space multiplexing and improve the decision accuracy compared to a case where a decision is made using only one index. Here, adaptability evaluation function value A shows a signal to noise ratio (SNR) of a received signal from mobile station apparatus 150. Furthermore, adaptability evaluation function value B is one measure to evaluate a spatial spread. Note that since correlation matrix R is a Hermitean matrix, its eigenvalues are real numbers.

$$A(\lambda_1, \lambda_2, \lambda_{Na}) = \frac{\lambda_1}{\lambda_{Na}} \quad \text{[Equation 5]}$$

$$B(\lambda_1, \lambda_2, \lambda_{Na}) = \frac{\lambda_2 - \lambda_{Na}}{\lambda_1 - \lambda_{Na}} \quad \text{[Equation 6]}$$

Transmission format setting section 110 sets a transmission format in a communication band based on adaptability evaluation function values A, B included in each detection result #m.

More specifically, transmission format setting section 110 compares adaptability evaluation function values A, B of each divided band DB-m with predetermined numbers respectively. As a result of this comparison, if both adaptability evaluation function values A and B are greater than the predetermined numbers, it is decided that the level of the received signal is high and the spatial spread is large, that is, it is decided to be suitable for space multiplexing transmission and a transmission format is set such that space multiplexing transmission is performed on the downlink. On the other hand, when any one of adaptability evaluation function values A and B is equal to or falls below the predetermined value, it is decided that the SNR is low or spatial spread is small and it is not suitable for space multiplexing transmission and a transmission format (space multiplexing number=1) is set such that space multiplexing transmission is not performed on the downlink and transmission with directivity is performed on one channel.

A transmission format is set by determining the space multiplexing number of a communication band, modulation scheme, coding rate and weighting factor for transmission/reception (hereinafter referred to as "transmission/reception weight"). When the space multiplexing number of the communication band is calculated, transmission format setting section 110 calculates a distribution of the space multiplexing numbers corresponding to divided bands DB-m and designates a space multiplexing number which accounts for the largest portion as the space multiplexing number of the communication band.

Furthermore, transmission format setting section 110 generates a transmission format control signal for reporting the set transmission format and outputs the signal to transmission format formation section 112.

Transmission format setting section 110 may also carry out processing of adaptively changing and setting an M-ary modulation number (modulation scheme) at modulation section 124 and a coding rate at coding section 122 in accordance with adaptability evaluation function value A. For example, since adaptability evaluation function value A indicates an SNR of the received signal, transmission format setting section 110 decreases the coding rate at coding section 122 and increases the M-ary modulation number at modulation section 124 as the channel quality increases. The set M-ary modulation number (modulation scheme) and coding rate are reported as a transmission format control signal to transmission format formation section 112 together with the space multiplexing number.

Furthermore, the predetermined number used for the comparison with adaptability evaluation function value B may be changed in conjunction with adaptability evaluation function value A. In this case, for example, it might be considered that the predetermined number used for the comparison with adaptability evaluation function value B may be decreased as adaptability evaluation function value A increases. By so doing, it is possible to adaptively control the transmission format setting based on the spatial spread according to the reception quality (SNR in this embodiment).

Coding section 122 codes a transmission data sequence based on the coding rate indicated in the transmission format control signal.

Modulation section 124 modulates the coded transmission data sequence based on the M-ary modulation number (modulation scheme) indicated in the transmission format control signal.

Space multiplexing section 126 divides the modulated transmission data sequence into the same number of portions as the space multiplexing number indicated in the transmission format control signal, multiplies each divided transmission data sequence by a transmission weight and outputs the multiplication results to S/P sections 114-1 to 114-Na.

S/P sections 114-1 to 114-Na convert in a serial-to-parallel manner the transmission data sequence input from space multiplexing section 126, whereby the transmission data sequence becomes a multicarrier signal converted to data sequences in a one-to-one correspondence with subcarrier signals. Mixers 128-1 to 128-Na mix the multicarrier signals input from S/P sections 114-1 to 114-Na and output the mixed signals to duplexers 104-1 to 104-Na.

Figure 4:
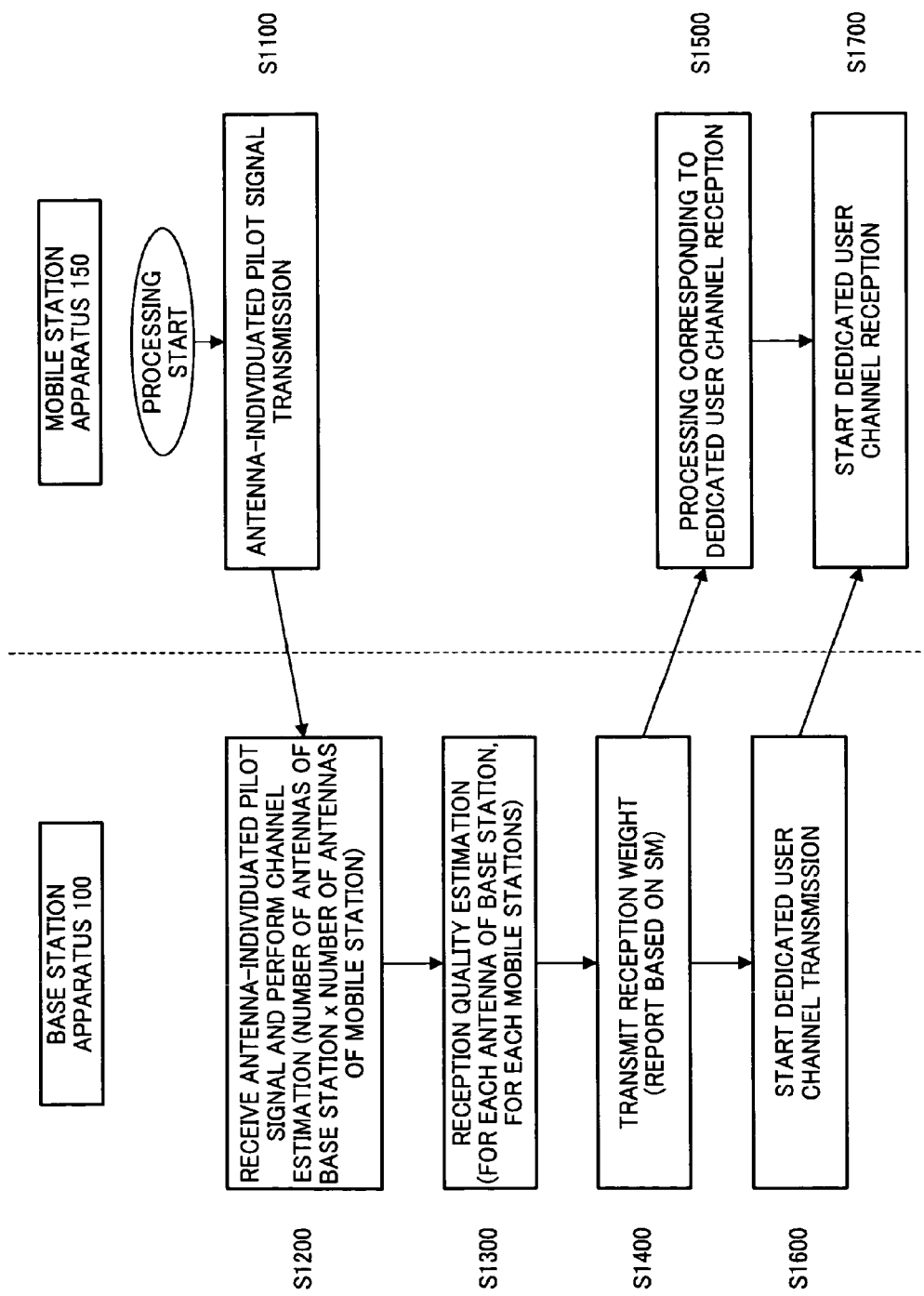
FIG. 4 illustrates an example of operation when the base station apparatus according to Embodiment 1 of the present invention carries out a radio communication with a mobile station apparatus.

Next, the operation of base station apparatus 100 having the above described configuration when wirelessly communicating with mobile station apparatus 150 will be explained. FIG. 4 illustrates an example of operation when base station apparatus 100 wirelessly communicates with mobile station apparatus 150. Here, a procedure will be explained in a space multiplexing transmission mode in a case of transiting from a normal transmission mode in which a transmission format for space multiplexing transmission is not used to a space multiplexing transmission mode in which the transmission format for space multiplexing transmission is used.

First, after frame synchronization and symbol synchronization are established, mobile station apparatus 150 transmits antenna-individuated pilot signals for space multiplexing transmission by means of time division or code division from antennas 152-1 to 152-Nr (S1100).

Correlation calculation section 170-n-k of base station apparatus 100 carries out channel estimation, that is, estimates Nr×Na channel estimation values h(j, k) (S1200), using the received antenna-individuated pilot signals. Here, j=1 to Nr. Next, adaptability evaluation function calculation section 190 estimates reception quality of antennas 102-1 to 102-Na for each mobile station apparatus (S1300).

Transmission format setting section 110 performs singular value decomposition to channel matrix H in which channel estimation value h(j, k) is expressed with a matrix as shown in (Equation 7). Right singular value vectors corresponding to Nm singular values $\lambda_j$ in descending order are designated as transmission weights (transmission weight vectors) for base station apparatus 100, and left singular value vectors corresponding to singular values $\lambda_j$ are designated as reception weights (reception weight vectors) at mobile station apparatus 150. Nm is a natural number that satisfies 1≤Nm<min(Nr, Na). This makes it possible to perform Nm space multiplexing transmissions. The above described operation is carried out for each of the subcarrier signals. The reception weights obtained are reported to mobile station apparatus 150 (S1400).

$$H = \begin{bmatrix} h(1,1) & h(1,2) & \ldots & h(1,N_a) \\ h(2,1) & h(2,2) & \ldots & h(2,N_a) \\ \vdots & \vdots & \vdots & \vdots \\ h(N_r,1) & h(N_r,2) & \ldots & h(N_r,N_a) \end{bmatrix}$$ [Equation 7]

Mobile station apparatus 150 carries out processing corresponding to reception of data channels (user channels) of individual users based on the reception weights (S1500). Base station apparatus 100 then starts transmission of dedicated user channels based on the transmission weights (S1600) and mobile station apparatus 150 starts reception of the dedicated user channels (S1700). The above-described operation makes it possible to perform space multiplexing transmission in accordance with the detection results of space multiplexing adaptability.

Thus, this embodiment takes advantage of a high spatial spectrum correlation between adjacent subcarrier signals, divides a communication band into a plurality of divided bands DB-1 to DB-Nd, combines correlation vectors Vn obtained from subcarrier signals which belong to respective divided bands DB-1 to DB-Nd to generate correlation matrix R, detects space multiplexing adaptability for each of the divided bands using generated correlation matrix R, and therefore, it is possible to detect a spatial spread of an average arriving path of subcarrier signals which belong to each of the respective divided bands. Therefore, by appropriately setting bandwidths of the divided bands and detecting space multiplexing adaptability for each of the divided bands, it is possible to reduce the amount of processing calculation compared to the detection of space multiplexing adaptability conducted for each of the subcarrier signals and suppress increases in the scale of the apparatus. This embodiment sets the transmission format of communication bands at one time, and therefore, it is possible to drastically reduce the amount of processing calculation compared to setting a transmission format for each of the subcarrier signals.

That is, this embodiment obtains an average spatial spread characteristic of an arriving path of a group of subcarrier signals which belong to each of the divided bands, and therefore, it is possible to introduce an evaluation index for evaluating the spatial characteristic of the group of subcarrier signals into space multiplexing transmission control. Since this evaluation index does not exist in the conventional technique, the conventional technique has no other choice but to set a transmission format for each of the subcarrier signals. Therefore, in a conventional art, a transmission format could be erroneously set when more errors occur in calculations of correlation values of subcarrier signals whose levels are dropped as a result of occurrence of a notch (level drop) in a specific band in the communication band depending on the propagation environment. On the contrary, according to this embodiment, it is possible to set a transmission format in a unit of the group of subcarrier signals by introducing the evaluation index and thereby prevent erroneous settings in the aforementioned case.

Furthermore, this embodiment allows switching to a space multiplexing transmission mode only when the state of a propagation path is decided to be suitable for space multiplexing transmission, and can thereby prevent drops in the effective transmission rate due to insertion of unnecessary pilot signals in a propagation path unsuitable for space multiplexing transmission, and prevent increases in power consumption due to unnecessary calculation processing.

The configuration of base station apparatus 100 is not limited to the above described one. For example, a configuration with which divided bands are changed adaptively in accordance with a propagation environment may be added to the above described configuration. For example, a configuration with which divided bands are changed based on a correlation bandwidth (coherent bandwidth) may be adopted. This configuration can provide an optimum tradeoff between the accuracy of transmission format setting and the amount of calculation.

Furthermore, the configuration of space multiplexing adaptability detection section 108 is not limited to the above described one. For example, a configuration calculating evaluation values on the mobility of mobile station apparatus 150 including an estimated moving speed and Doppler frequency estimate of mobile station apparatus 150 may be added to the above described configuration. In this case, since a delay is produced due to SM assignment processing, when mobile station apparatus 150 is in a state of a predetermined or higher mobility, a transmission format that prevents SM transmission is set to mobile station apparatus 150. This stabilizes space multiplexing transmission.

Furthermore, this embodiment explained the case where the radio communication apparatus of the present invention is applied to base station apparatus 100 and explained the setting of a transmission format on a downlink, but it is also possible to apply the radio communication apparatus of the present invention to mobile station apparatus 150 to thereby enable setting of a transmission format on an uplink.

Furthermore, adaptability evaluation function values A, B are not limited to the above described ones. In addition, as adaptability evaluation function value A, it is also possible to use power of a received signal (RSSI: Received Signal Strength Indicator), use an average signal level of a received pilot signal or use an SNR in which S is the average signal level of a received pilot signal and N is a distribution situation of instantaneous pilot received signals. Furthermore, adaptability evaluation function value B may also be calculated based on the spread of an angle spectrum used to estimate a direction of arrival of paths. In this case, by conveniently performing variable sweeping of θ that means the direction of arrival of paths in angle spectrum evaluation function F(θ) as shown in (Equation 8) and calculating a spectral spread in a direction of a peak of the angle spectrum, it is possible to obtain adaptability evaluation function value B. Here, a(θ) indicates direction vectors of antennas 102-1 to 102-Na and can be expressed as shown in (Equation 9) when antennas 102-1 to 102-Na form an equi-distant rectilinear array. Furthermore, d denotes an antenna interval and λ denotes a wavelength in a carrier frequency band.

$$F(\theta) = a(\theta)^H R a(\theta) \qquad \text{[Equation 8]}$$

$$a(\theta) = \begin{bmatrix} 1 \\ \exp\{-j2\pi d \cdot 1 \cdot \sin\theta/\lambda\} \\ \vdots \\ \exp\{-j2\pi d \cdot (Na-1) \cdot \sin\theta/\lambda\} \end{bmatrix} \qquad \text{[Equation 9]}$$

Here, a Fourier method is used, but it is also possible to use an angle spectrum according to an eigenvalue decomposition technique such as a well-known MUSIC method and ESPRIT method or a high resolution technique for estimation of direction of arrival of path, such as Capon method including inverse matrix calculation of a correlation matrix.

Furthermore, a space smoothing technique may be applied to correlation matrix R to suppress a correlated wave. However, when the number of subcarrier signals which belong to each of the divided bands is smaller than the number of antennas, the number of ranks of correlation matrix R which is the output of correlation matrix generation section 180 may not become full. For this reason, it is necessary to conveniently select a direction estimation algorithm according to the number of subcarrier signals which belong to each of the divided bands or according to the sum of the number of subcarrier signals and the number of paths. Furthermore, when the configuration of antennas 102-1 to 102-Na is an equi-distant rectilinear array arrangement, it is also possible to apply space smoothing processing to correlation matrix R obtained at correlation matrix generation section 180 or apply processing of estimating the direction of arrival using a beam space which is multiplied by a unitary conversion matrix and whose directional vectors are thus transformed to real numbers.

Correlation matrix generation section 180 may generate correlation vector z shown in (Equation 10) below instead of correlation matrix R shown in (Equation 4) above. In this case, adaptability evaluation function calculation function 190 calculates adaptability evaluation function value A(z) shown in (Equation 11) below instead of adaptability evaluation function value A shown in (Equation 5) above and calculates adaptability evaluation function value B(z) shown in (Equation 12) below instead of adaptability evaluation function value B shown in (Equation 6) above.

$$z = \frac{1}{Nc}\sum_{n=1}^{Nc} V_{n,1}^* V_n \quad \text{[Equation 10]}$$

$$A(z) = \frac{z_1}{\frac{1}{NcNp}\sum_{n=1}^{Nc}\sum_{s=1}^{Np}|f_{n-1}(t_0+No(s-1))r^*(s)-h_{n,1}|^2} \quad \text{[Equation 11]}$$

$$B(z) = \frac{|z_1|}{|z_2|} \quad \text{[Equation 12]}$$

That is, SNR evaluation (=S/N) is performed using pilot signal r(s) transmitted from mobile station apparatus 150 first. In this evaluation, adaptability evaluation function value A(z) shown in (Equation 11) is used. Here, $z_k$ denotes a kth element in correlation vector z shown in (Equation 10). The correlation between the signals received at antennas 102-1 to 102-Na using correlation vector z is evaluated by calculating adaptability evaluation function value B(z) shown in (Equation 12).

Furthermore, this embodiment explained the configuration in which correlation matrix R is generated using known pilot signals with a combination of replica generation section 160, correlation calculation section 170-n-k and correlation matrix generation section 180 in FIG. 3, but the internal configuration of space multiplexing adaptability detection section 108 is not limited to this. For example, it is also possible to apply a technique of calculating a correlation matrix without using any pilot signals. In this case, it is possible to calculate a correlation matrix by calculating a correlation value between different branches in the array antenna. The element (j, k) of correlation matrix Rb calculated here can be expressed by (Equation 13) below. Nb is the predetermined number of pieces of sample data. This technique requires no pilot signals, and can thereby suppress a decrease in the transmission efficiency caused by insertion of pilot signals. Furthermore, similar processing is also applicable to correlation vector z.

$$r_{jk} = \frac{1}{Nb}\sum_{s=1}^{Nb} f_{n-j}^*(t)f_{n-k}(t) \quad \text{[Equation 13]}$$

Furthermore, in this embodiment, the subcarrier signals transmitted as the multicarrier signals may also be subcarrier signals which have been subjected to orthogonal frequency division multiplexing. In this case, frequencies at which subcarrier signals are orthogonal to one another within an OFDM symbol period are selected and used. Furthermore, this embodiment is also applicable to an MC-CDMA (MultiCarrier-Code Division Multiple Access) scheme in which transmission signals are code division multiplexed in the frequency axis direction. In this case, it is possible to realize operations and effects similar to those described above by calculating the correlation value of each subcarrier signal for each user using a pilot signal embedded in the subcarrier signal and multiplexed for each individual user.

Embodiment 2

Figure 5:
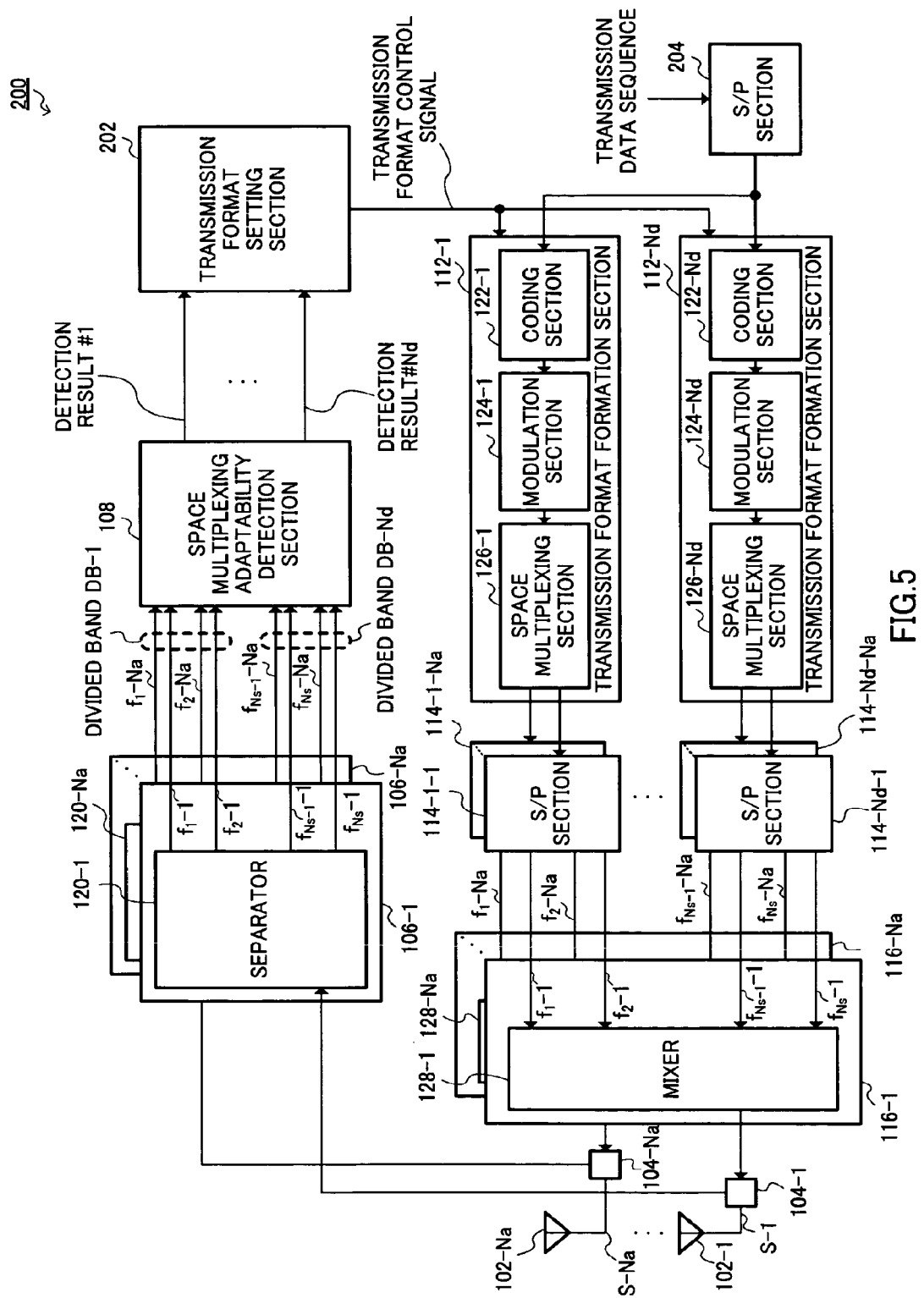
FIG. 5 is a block diagram showing the configuration of a base station apparatus according to Embodiment 2 of the present invention.

FIG. 5 is a block diagram showing the configuration of a base station apparatus according to Embodiment 2 of the present invention. The base station apparatus according to this embodiment has the basic configuration similar to that of the base station apparatus explained in Embodiment 1 and the same components are assigned the same reference numerals and detailed explanations thereof will be omitted.

The base station apparatus 200 shown in FIG. 5 includes Nd transmission format formation sections 112-1 to 112-Nd having the same internal configurations as that of transmission format formation section 112 explained in Embodiment 1, Nd sets of S/P sections 114-1-1 to 114-1-Na, . . . , 114-Nd-Na having the same internal configurations as those of S/P sections 114-1 to 114-Na explained in Embodiment 1, transmission format setting section 202 instead of transmission format setting section 110 explained in Embodiment 1 and S/P section 204 that serial/parallel-converts a transmission data sequence to Nd data sequences.

A feature of the base station apparatus 200 of this embodiment is to set a transmission format of each divided band as opposed to base station apparatus 100 of Embodiment 1 that sets a transmission format of the communication band.

Transmission format setting section 202 sets a transmission format for divided bands based on adaptability evaluation function values A and B included in detection results #m.

More specifically, transmission format setting section 202 compares adaptability evaluation function values A and B of divided bands DB-m with their respective predetermined numbers. As a result of this comparison, when both adaptability evaluation function values A, B are greater than the predetermined numbers, it is decided that the level of a received signal is high and the spatial spread is large. In other words, it is decided to be suitable for space multiplexing transmission and a transmission format is set such that space multiplexing transmission is performed on a downlink. On the other hand, when any one of adaptability evaluation function values A, B is equal to or falls below the predetermined value, it is decided that the SNR is low or the spatial spread is small and it is decided not to be suitable for space multiplexing transmission and a transmission format (space multiplexing number=1) is set such that transmission with directivity is performed on one channel without carrying out space multiplexing transmission on the downlink.

The transmission format is set by calculating a space multiplexing number, modulation scheme, coding rate and transmission/reception weight for each of the divided bands.

Furthermore, transmission format setting section 202 generates a transmission format control signal for reporting the transmission format set for each divided band and outputs the transmission format control signal to transmission format formation sections 112-1 to 112-Nd.

Note that transmission format setting section 202 may also carry out processing of adaptively changing and setting the M-ary modulation number (modulation scheme) in modulation sections 124-1 to 124-Nd and coding rates in coding sections 122-1 to 122-Nd in accordance with adaptability evaluation function value A. For example, since adaptability evaluation function value A indicates an SNR of a received signal, transmission format setting section 202 decreases the coding rates at coding sections 122-1 to 122-Nd or increases the M-ary modulation number at modulation sections 124-1 to 124-Nd, as the channel quality improves. The set M-ary modulation number (modulation scheme) and coding rate are reported to transmission format formation sections 112-1 to 112-Nd as the transmission format control signal together with the space multiplexing number.

Furthermore, the predetermined number used for a comparison with adaptability evaluation function value B may also be changed in conjunction with adaptability evaluation function value A. In this case, this embodiment may be adapted in such a way that the predetermined number to be used for the comparison with adaptability evaluation function value B is decreased as adaptability evaluation function value A increases.

As opposed to transmission format formation section 112 explained in Embodiment 1 that forms the transmission format of the communication band, transmission format formation sections 112-1 to 112-Nd form a transmission format for each divided band and output a transmission data sequence space-multiplexed (or not space-multiplexed) for each divided band to mixers 128-1 to 128-Na via the corresponding S/P sections.

Thus, this embodiment takes advantage of the fact that the correlation in the spatial spectrum between adjacent subcarrier signals is high, divides the communication band into a plurality of divided bands DB-1 to DB-Nd, combines correlation vectors Vn obtained from each subcarrier signal which belongs to each of the divided bands DB-1 to DB-Nd to generate correlation matrix R, detects space multiplexing adaptability for each of the divided bands using generated correlation matrix R, and therefore, it is possible to detect a spatial spread of average arriving paths of subcarrier signals which belong to each divided band. Therefore, by appropriately setting the bandwidths of the divided bands and detecting space multiplexing adaptability for each of the divided bands, it is possible to reduce the amount of processing calculation compared to the detection of space multiplexing adaptability carried out for each of the subcarrier signals and suppress increases in the scale of the apparatus. Since a transmission format is set for each of the divided bands in this embodiment, it is possible not only to reduce the amount of processing calculation but also to set an optimum transmission format for each divided band.

This embodiment explained the case where the radio communication apparatus of the present invention is applied to base station apparatus 200 and explained the setting of the transmission format on the downlink, but it is also possible to apply the radio communication apparatus of the present invention to the mobile station apparatus side and thereby set a transmission format on the uplink.

Furthermore, this embodiment can also apply a technique of calculating a correlation matrix without using pilot signals as explained using (Equation 13) in Embodiment 1.

Embodiment 3

Figure 6:
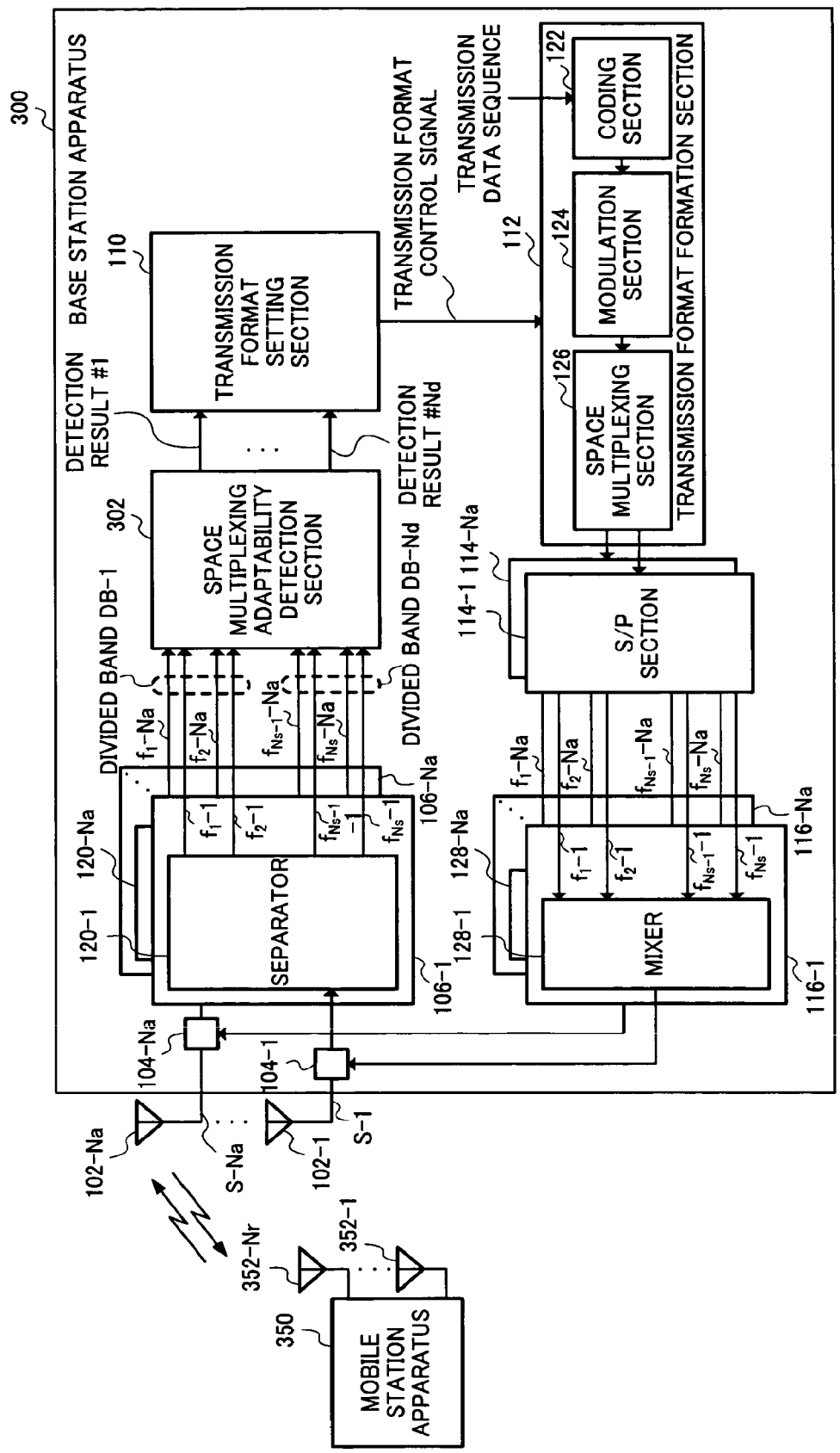
FIG. 6 is a block diagram showing the configuration of a base station apparatus according to Embodiment 3 of the present invention.

FIG. 6 is a block diagram showing the configuration of a base station apparatus according to Embodiment 3 of the present invention. The base station apparatus according to this embodiment has the basic configuration similar to that of base station apparatus 100 explained in Embodiment 1 and the same components are assigned the same reference numerals and explanations thereof will be omitted. Furthermore, this embodiment will explain a case with a radio communication system under an FDD (Frequency Division Duplex) scheme.

The base station apparatus 300 shown in FIG. 6 includes space multiplexing adaptability detection section 302 instead of space multiplexing adaptability detection section 108 explained in Embodiment 1.

Furthermore, SM-based mobile station apparatus 350 that communicates with base station apparatus 300 by radio includes Nr antennas 352-1 to 352-Nr.

A feature of base station apparatus 300 of this embodiment is to detect space multiplexing adaptability based on feedback information from a mobile station apparatus as opposed to Embodiment 1 in which space multiplexing adaptability is detected based on a result of reception of an uplink signal at the base station apparatus.

Space multiplexing adaptability detection section 302 extracts feedback information from a signal received from the mobile station apparatus 350. The feedback information is information including a channel estimation value calculated by mobile station apparatus 350 using antenna-individuated pilot signals and measured reception quality.

Furthermore, space multiplexing adaptability detection section 302 generates detection results #1 to #Nd for the respective divided bands using the extracted feedback information and outputs the detection results to transmission format setting section 110.

It is also possible to provide space multiplexing adaptability detection section 302 in mobile station apparatus 350 so that detection results #1 to #Nd for the respective divided bands are generated in the mobile station apparatus side and the results may be used as feedback information to the base station apparatus side. Or it is also possible to provide space multiplexing adaptability detection section 302 and transmission format setting section 110 in mobile station apparatus 350 so that detection results #1 to #Nd for the respective divided bands are generated in the mobile station apparatus and the setting results by transmission format setting section 110 may be used as feedback information to the base station apparatus side. Thus, by modifying the apparatus configuration on the mobile station apparatus side, it is possible to reduce the amount of feedback information and increase the efficiency of frequency utilization.

Figure 7:
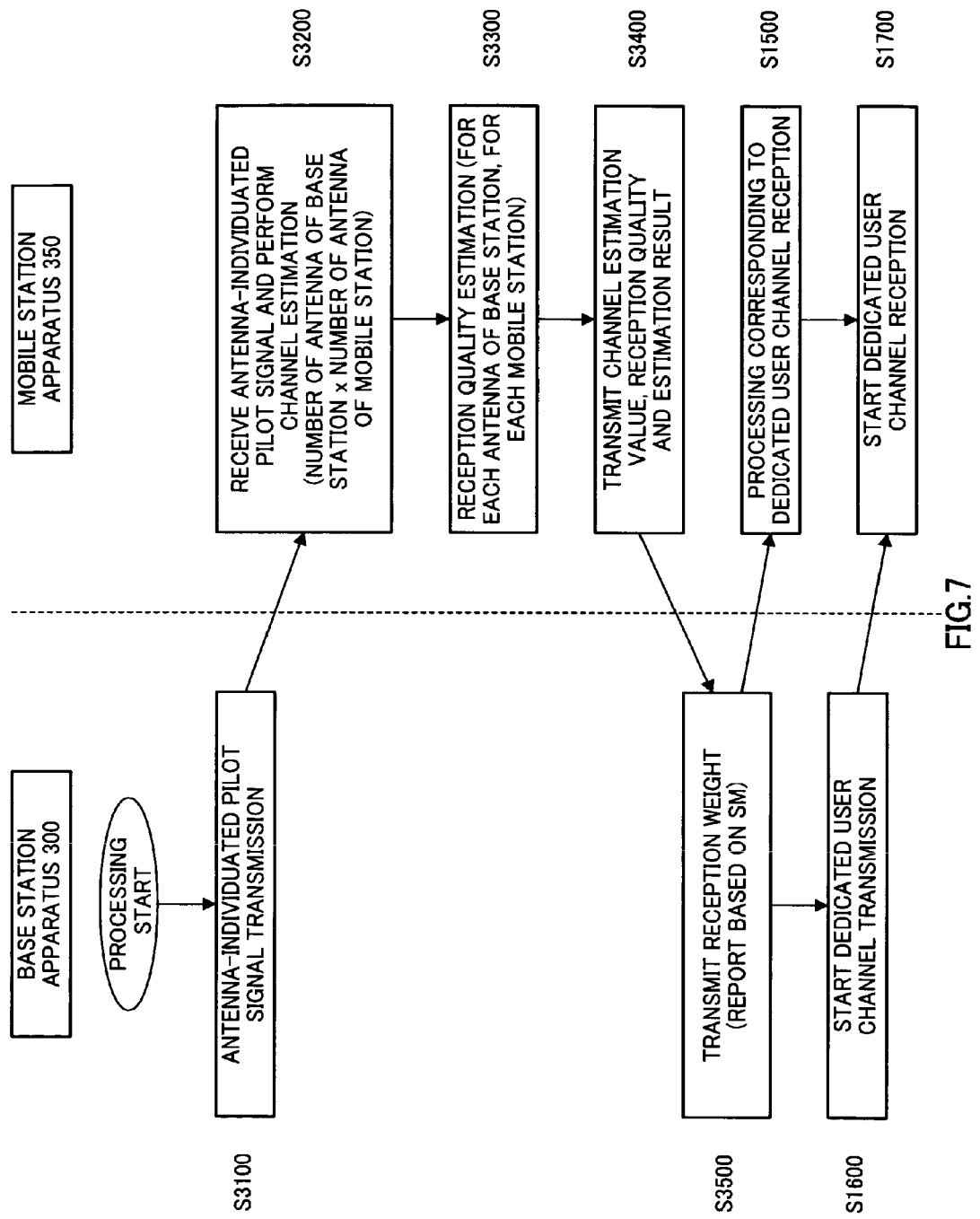
FIG. 7 illustrates an example of operation when the base station apparatus according to Embodiment 3 of the present invention carries out a radio communication with a mobile station apparatus.

Next, the operation of base station apparatus 300 in the above described configuration that wirelessly communicates with mobile station apparatus 350 will be explained. FIG. 7 illustrates an example of the operation when base station apparatus 300 wirelessly communicates with mobile station apparatus 350. Here, a procedure will be explained in a space multiplexing transmission mode in a case of transiting from a normal transmission mode in which a transmission format for space multiplexing transmission is not used to a space multiplexing transmission mode in which a transmission format for space multiplexing transmission is used.

First, after frame synchronization and symbol synchronization are established, base station apparatus 300 transmits antenna-individuated pilot signals for space multiplexing transmission from the respective antennas 102-1 to 102-Na (S3100). An antenna-individuated pilot signal is made up of a predetermined number of symbols Np.

Figure 8:
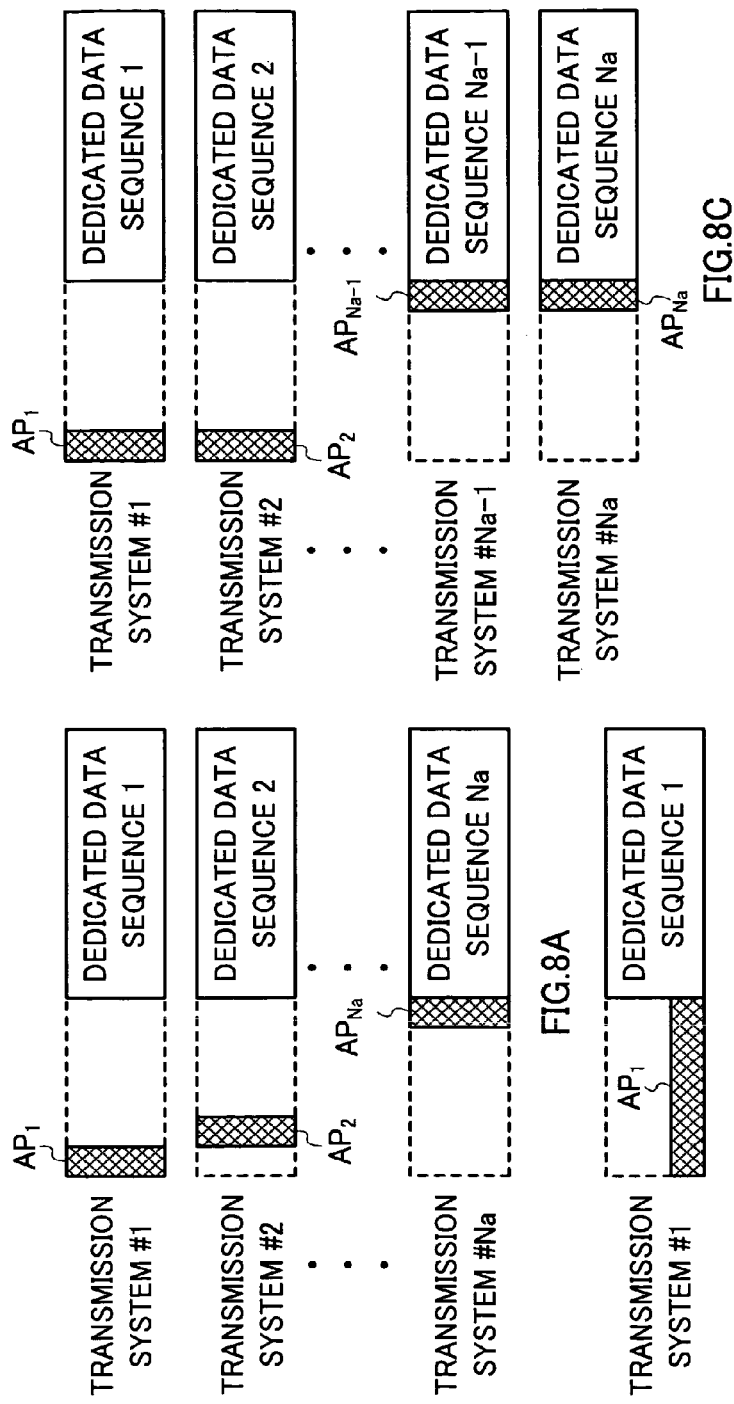
FIG. 8A illustrates the frame configuration of an antenna-individuated pilot signal transmitted by means of time division multiplexing from the base station apparatus according to Embodiment 3 of the present invention.
FIG. 8B illustrates the frame configuration of an antenna-individuated pilot signal transmitted by means of code division multiplexing from the base station apparatus according to Embodiment 3 of the present invention.
FIG. 8C illustrates the frame configuration of an antenna-individuated pilot signal transmitted by means of a combination of time division multiplexing and code division multiplexing from the base station apparatus according to Embodiment 3 of the present invention.

Here, antenna-individuated pilot signals transmitted will be explained with reference to the accompanying drawings. FIG. 8A, FIG. 8B and FIG. 8C show frame configurations of antenna-individuated pilot signals. For example, as shown in FIG. 8A, an antenna-individuated pilot signal $AP_k$ having the same pattern or patterns orthogonal to each other (e.g., PN signal) may be transmitted by means of time division multiplexing whereby a transmission timing is shifted from one antenna to another. Furthermore, as shown in FIG. 8B, antenna-individuated pilot signal $AP_k$ may be transmitted by means of code division multiplexing. In this case, antenna-individuated pilot signal $AP_k$ has patterns orthogonal to one another among the antennas.

Furthermore, as shown in FIG. 8C, antenna-individuated pilot signal $AP_k$ may also be transmitted by means of a combination of time division multiplexing and code division multiplexing. That is, in this case, patterns orthogonal to one another are used for antenna-individuated pilot signals (e.g., $AP_1$ and $AP_2$ in FIG. 8C) which share a time division slot of the same time instant are used. By transmitting antenna-individuated pilot signals by means of the combination of time division multiplexing and code division multiplexing, it is possible to reduce overhead of time division transmission in a case of the number of antennas Na of base station apparatus 300 being large, which alleviates a reduction of orthogonality in a propagation path during code division multiplexing.

When the number of antennas Na is sufficiently large or the space multiplexing number in SM is limited to a value smaller than the number of antennas Na, it is not necessary to use all Na transmission systems. For example, it is also possible to transmit antenna-individuated pilot signals from several ones of antennas 102-1 to 102-Na.

Mobile station apparatus 350 separates and receives antenna-individuated pilot symbol $AP_k(t)$ included in antenna-individuated pilot signal $AP_k$ through antennas 350-1 to 350-Nr (t=1 to Np). Mobile station apparatus 350 then performs channel estimation using separately received antenna-individuated pilot symbol $AP_k(t)$ (S3200).

More specifically, mobile station apparatus 350 carries out a correlation calculation between reception result $r_{j,k}(t)$ of antenna-individuated pilot symbol $AP_k(t)$ at antenna 350-j (j=1 to Nr) of mobile station apparatus 350 and replica $AP_k(t)$ of the antenna-individuated pilot signal generated inside of mobile station apparatus 350 and thereby calculates channel estimation value h(j, k) as shown in (Equation 14). That is, Na×Nr channel estimation values h(j, k) are calculated. "*" denotes a complex conjugate transposition operator.

$$h(j, k) = \sum_{t=1}^{Np} AP_k^*(t) r_{j,k}(t)$$ [Equation 14]

At this time, it is also possible to save reception result $r_{j,k}(t)$ a plurality of times and apply averaging processing to the plurality of saved reception results $r_{j,k}(t)$. In this case, when the moving speed of mobile station apparatus 350 is sufficiently small, it is possible to reduce the influence of noise and improve the accuracy of channel estimation.

Mobile station apparatus 350 then estimates reception quality P(j, k) of antenna-individuated pilot signals and antennas of mobile station apparatus 350 (S3300). Here, received signal power, SIR (signal to noise ratio) and SNR or the like may be used as reception quality, but a case will be explained where SNR is used as an example. When signal power is assumed to be $S(j, k)=|h(j, k)|^2/Np$ and noise power is calculated using (Equation 15) below, it is possible to estimate reception quality P(j, k) by calculating S(j, k)/N(j, k).

$$N(j, k) = \frac{1}{Np} \sum_{t=1}^{Np} |r_{j,k}(t) - S(j, k)|^2$$ [Equation 15]

Mobile station apparatus 350 then transmits calculated channel estimation value h(j, k) and reception quality P(j, k) to base station apparatus 300 (S3400). With regard to the reception quality, instead of transmitting Na×Nr reception quality P(j, k) values, it is also possible to transmit averaged Na×Nr reception quality P(j, k) values as shown in (Equation 16) below to reduce feedback information. Furthermore, instead of transmitting the averaged value, it is also possible to transmit a median value or maximum value of Na×Nr reception quality P(j, k) values.

$$P_s = \frac{1}{N_a N_r} \sum_{k=1}^{Na} \sum_{j=1}^{Nr} P(j, k)$$ [Equation 16]

Space multiplexing adaptability detection section 302 of base station apparatus 300 then extracts feedback information including channel estimation value h(j, k) and reception quality P(j, k) from the received signal from mobile station apparatus 350. Then, transmission format setting section 110 decomposes channel matrix H which expresses channel estimation value h(j, k) in matrix as shown in (Equation 7) into singular values. The right singular value vectors corresponding to Nm singular values $\lambda_j$ in descending order are designated as transmission weights (transmission weight vectors) at base station apparatus 300 and the left singular value vectors corresponding to singular values $\lambda_j$ is designated as reception weight (reception weight vector) at mobile station apparatus 350. This allows Nm space multiplexing transmission to be performed. Here, it is also possible to carry out adaptive transmission power control by applying a water pouring theorem to calculated singular values $\lambda_j$. The above described operation is carried out for each of the subcarriers. The reception weight obtained is reported to mobile station apparatus 350 (S3500). Steps S1500 to S1700 explained in Embodiment 1 are then executed.

In the above described operation, after base station apparatus 300 transits to the space multiplexing mode, it is also possible to detect space multiplexing adaptability based on the magnitudes of singular values obtained through singular value decomposition of channel matrix H.

Furthermore, when no transmission beam is formed using eigenvectors, that is, when BLAST type space multiplexing in which data sequences differing from one antenna to another are transmitted is used, the channel estimation result and reception quality calculation result need not be fed back. In this case, mobile station apparatus 350 carries out reception processing on dedicated user channels to be multiplexed based on the channel estimation result and reception quality calculation result.

Thus, according to this embodiment, base station apparatus 300 detects space multiplexing adaptability for each of the divided bands based on feedback information from mobile station apparatus 350, and therefore a radio communication system based on an FDD scheme can also realize operations and effects similar to those of Embodiment 1.

Note that the detection of space multiplexing adaptability for each of the divided bands at base station apparatus 300 based on feedback information from mobile station apparatus 350 is also applicable to a radio communication system based on a TDD scheme.

Furthermore, this embodiment explained a case where the radio communication apparatus of the present invention is applied to base station apparatus 300 and explained the setting of a transmission format on the downlink, but it is also possible to set a transmission format on the uplink by applying the radio communication apparatus of the present invention to mobile station apparatus 350.

Furthermore, as explained in Embodiment 1 using (Equation 13), this embodiment can also use a technique of calculating a correlation matrix without using pilot signals.

Embodiment 4

Figure 9:
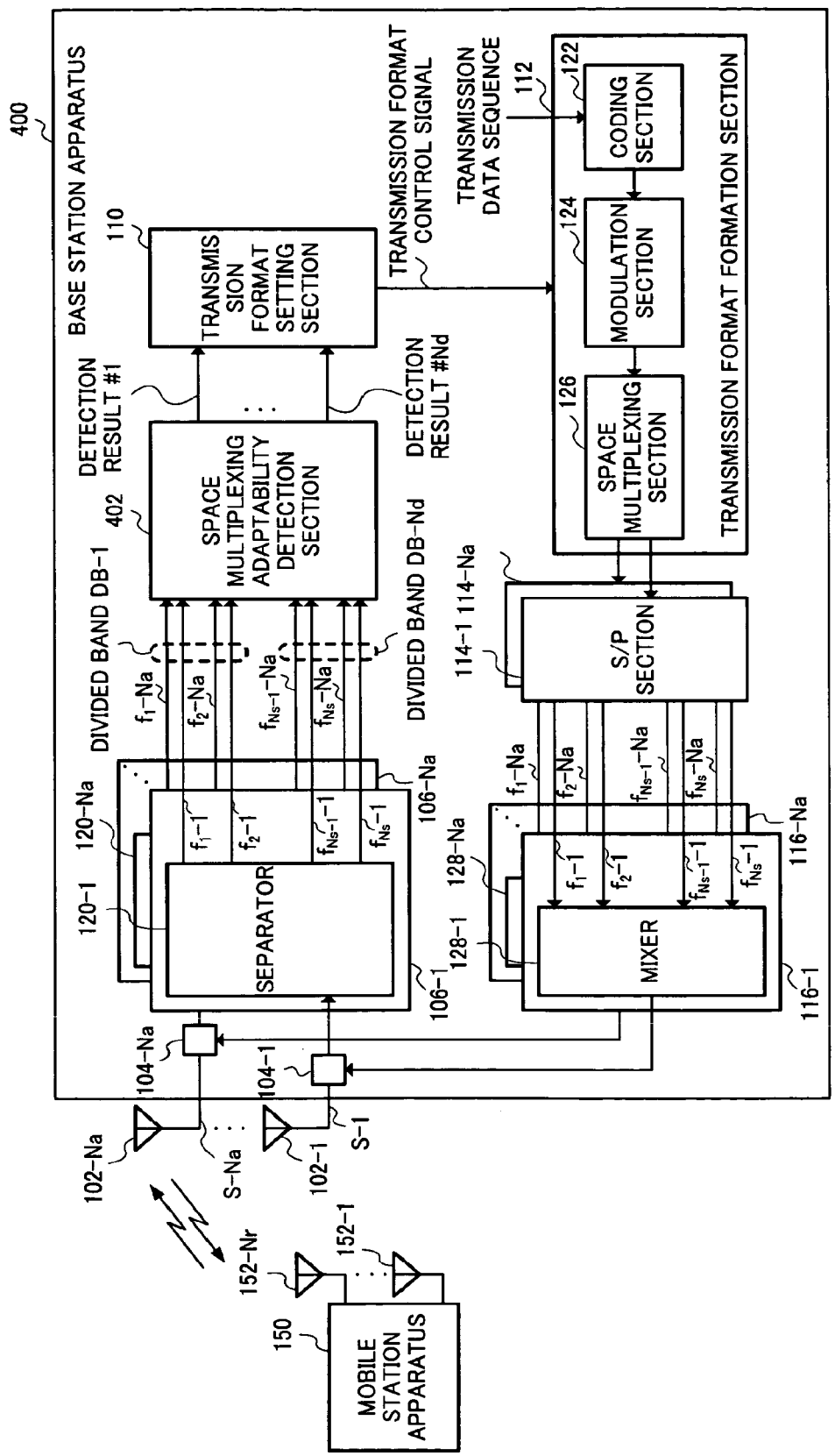
FIG. 9 is a block diagram showing the configuration of a base station apparatus according to Embodiment 4 of the present invention.

FIG. 9 is a block diagram showing the configuration of a base station apparatus according to Embodiment 4 of the present invention. The base station apparatus according to this embodiment has the basic configuration similar to that of base station apparatus 100 explained in Embodiment 1 and the same components are assigned the same reference numerals and explanations thereof will be omitted. Furthermore, this embodiment will explain a radio communication system using an MC-CDMA scheme with which each subcarrier signal is directly spread in a time-axis direction.

Base station apparatus 400 shown in FIG. 9 includes space multiplexing adaptability detection section 402 instead of space multiplexing adaptability detection section 108 explained in Embodiment 1.

A feature of the base station apparatus of this embodiment is to detect path timings using pilot signals embedded in their respective subcarrier signals from a mobile station apparatus and calculate a correlation value to be used for space multiplexing adaptability for each of the path timings detected.

Space multiplexing adaptability detection section 402 detects space multiplexing adaptability for each of Nd divided bands DB-1 to DB-Nd obtained by dividing the communication band to which Ns subcarrier signals $f_1$-k to $f_{Ns}$-k belong into Nd portions and outputs detection results #1 to #Nd to transmission format setting section 110.

Figure 10:
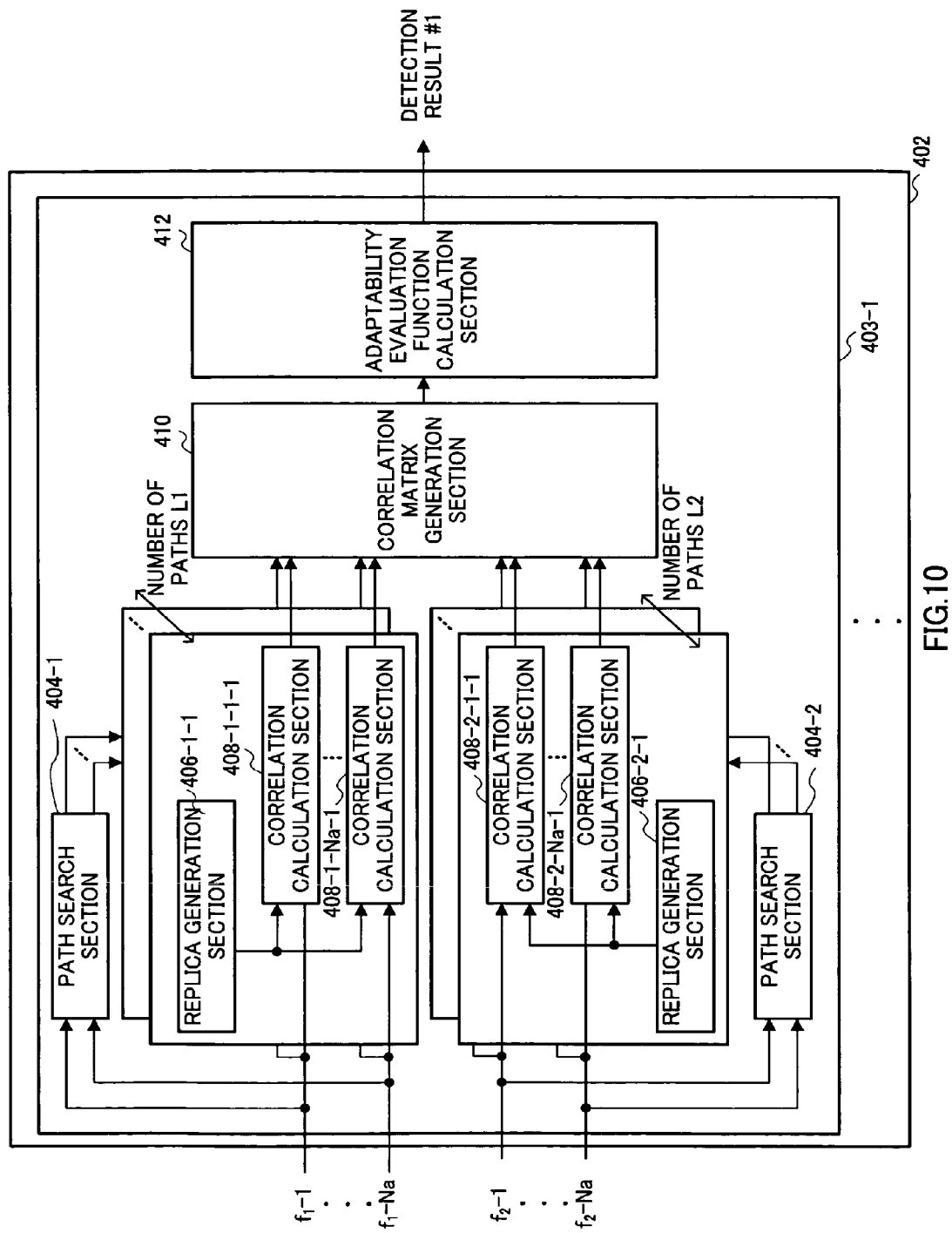
FIG. 10 is a block diagram showing main components of the configuration of a space multiplexing adaptability detection section according to Embodiment 4 of the present invention.

Here, the internal configuration of space multiplexing adaptability detection section 402 will be explained using FIG. 10. Space multiplexing adaptability detection section 402 includes Nd divided band processing sections 403-1 to 403-Nd corresponding to divided bands DB-m. FIG. 10 only shows the configuration of divided band processing section 403-1 which processes divided band DB-1 for convenience of explanation. The configurations of the remaining divided band processing sections 403-2 to 403-Nd are similar to the configuration of divided band processing section 403-1 and explanations thereof will be omitted. FIG. 10 shows a case where the number of subcarrier signals which belong to one divided band is 2 as an example and subcarrier signals $f_1$-k, $f_2$-k belong to divided band DB-1.

Divided band processing section 403-m includes path search section 404-n that detects timings of Ln arriving paths for each of the subcarrier signals using a pilot signal which is a known signal embedded in subcarrier signals $f_{n(m)}$-k, replica generation sections 406-n-1 to 406-n-Ln that generate replicas of the pilot signals, correlation calculation sections 408-n-k-1 to 408-n-k-Ln that calculate correlation values between reception pilot symbols which are included in subcarrier signals $f_{n(m)}$-k, and the generated replica, correlation matrix generation section 410 that generates a correlation matrix based on the calculated correlation value, and adaptability evaluation function calculation section 412 that calculates an adaptability evaluation function for evaluating adaptability to space multiplexing transmission based on the generated correlation matrix.

Note that divided band processing section 403-m need not use all subcarrier signals $f_{n(m)}$-k which belong to divided band DB-m as in the case of divided band processing section 156-m. For example, it is also possible to puncture some of subcarrier signals $f_{n(m)}$-k and then carry out processing on divided band DB-m. When a subcarrier signal is punctured, it is difficult to improve the detection accuracy of adaptability to space multiplexing transmission, but it is possible to obtain an effect of reducing the amount of processing calculation.

Path search section 404-n creates a delay profile using a pilot signal embedded in subcarrier signals $f_{n(m)}$-k and detects path timings using the delay profile created. Correlation value $h_{nk}(t_j)$ at jth path timing $t_j$ corresponding to nth subcarrier signal $f_n$-k received at kth antenna 102-k is expressed in (Equation 17) below. Here, suppose a pilot signal is expressed with r(s).

$$h_{nk}(t_j) = \sum_{s=1}^{Np} f_{n-k}(t_j + No \cdot (s-1)) r^*(s) \quad \text{[Equation 17]}$$

The delay profile is generated using (1) a method of combining absolute values or squares of correlation value $h_{nk}(t_j)$ of the same timing, (2) a method of generating a plurality of delay profiles by multiplying correlation values $h_{nk}(t_j)$ of the same timing by weights for forming directional beams, summing up the multiplication results and acquiring an absolute value or square thereof, or (3) a method of combining them. Furthermore, it is possible to suppress a noise component by averaging the delay profile over a plurality of frames.

Correlation matrix generation section 410 generates correlation matrix R shown in (Equation 19) using correlation vector Vn shown in (Equation 18) based on calculated correlation value $h_{nk}(t_j)$.

$$V_n(t_j) = [h_{n,1}(t_j) \ h_{n,2}(t_j) \ldots h_{n,Na}(t_j)]^T \quad \text{[Equation 18]}$$

$$R = \frac{1}{NcLn} \sum_{n=1}^{Nc} \sum_{j=1}^{Ln} V_n(t_j) V_n(t_j)^H \quad \text{[Equation 19]}$$

Adaptability evaluation function calculation section 412 applies an eigenvalue expansion to generated correlation matrix R as in the case of adaptability evaluation function calculation section 190 explained in Embodiment 1 and obtains Na eigenvalues $\lambda_k$. Furthermore, calculated eigenvalues $\lambda_k$ are sorted in descending order and assigned subscripts are assigned from the maximum one. Adaptability evaluation function values A and B shown in (Equation 5) and (Equation 6) are generated and these are output as detection result #m.

Thus, this embodiment detects path timings using a pilot signal embedded in each subcarrier signal from mobile station apparatus 150, calculates a correlation value to be used to detect space multiplexing adaptability for each of the detected path timings, and therefore, it is possible to detect adaptability for each of the divided bands including multipath signals arriving at base station apparatus 400 and improve the detection accuracy by a path diversity effect.

Note that correlation matrix generation section 410 may also generate correlation vector z shown in (Equation 20) below instead of correlation matrix R shown in (Equation 19) above. In this case, adaptability evaluation function calculation section 412 calculates adaptability evaluation function value A(z) shown in (Equation 21) below instead of adaptability evaluation function value A shown in (Equation 18) above and calculates adaptability evaluation function value B(z) shown in (Equation 22) below instead of adaptability evaluation function value B shown in (Equation 19) above.

$$z = \frac{1}{NcLn} \sum_{n=1}^{Nc} \sum_{j=1}^{Ln} V_{n,1}^*(t_j) V_n(t_j) \quad \text{[Equation 20]}$$

-continued $$A(z) = \frac{z_1}{\frac{1}{NcLnNp}\sum_{n=1}^{Nc}\sum_{j=1}^{Ln}\sum_{s=1}^{Np}|f_{n-1}(t_0 + No(s-1))r^*(s) - h_{n,1}|^2}$$ [Equation 21]

$$B(z) = \frac{|z_1|}{|z_2|}$$ [Equation 22]

That is, an SNR (=S/N) is evaluated using pilot signal r(s) transmitted from mobile station apparatus 150 first. In this evaluation, adaptability evaluation function value A shown in (Equation 21) is used. Here, $z_k$ denotes the kth element in correlation vector z shown in (Equation 20). Next, the correlation between the signals received at antennas 102-1 to 102-Na is evaluated using correlation vector z by calculating adaptability evaluation function value B(z) shown in (Equation 22).

Furthermore, this embodiment explained a case where the radio communication apparatus of the present invention is applied to base station apparatus 400 and explained the setting of a transmission format on the downlink, but it is also possible to set a transmission format on the uplink by applying the radio communication apparatus of the present invention to the mobile station apparatus side.

Furthermore, in this embodiment, it is also possible to apply a technique of calculating a correlation matrix without using any pilot signals as explained in Embodiment 1 using (Equation 13).

Embodiment 5

Figure 11:
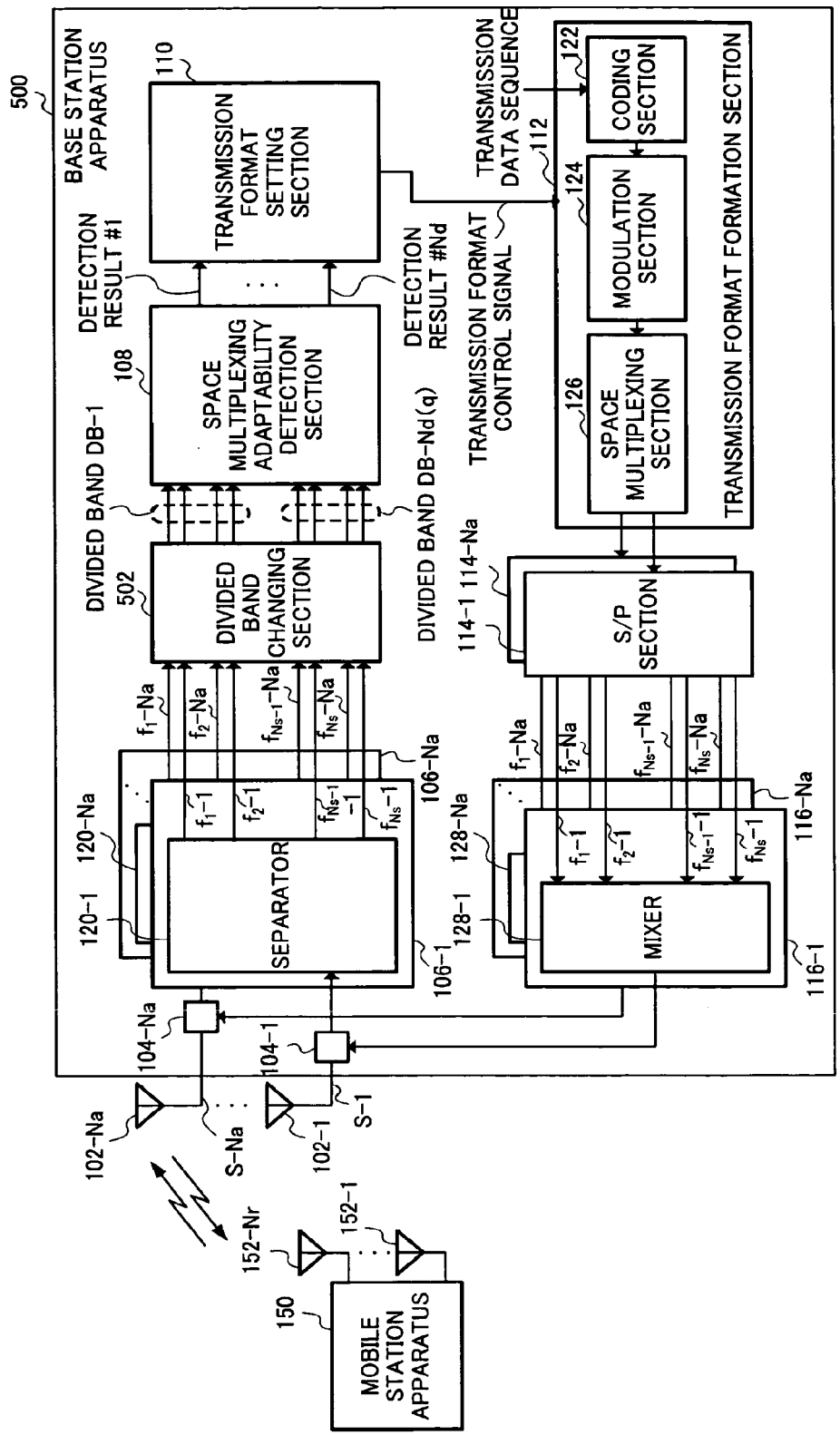
FIG. 11 is a block diagram showing the configuration of a base station apparatus according to Embodiment 5 of the present invention.

FIG. 11 is a block diagram showing the configuration of a base station apparatus according to Embodiment 5 of the present invention. The base station apparatus according to this embodiment has the basic configuration similar to that of base station apparatus 100 explained in Embodiment 1 and the same components are assigned the same reference numerals and explanations thereof will be omitted. Furthermore, this embodiment will explain a radio communication system using a multicarrier scheme under which code division multiplexing is carried out for a plurality of users through spreading in the frequency axis direction.

Base station apparatus 500 shown in FIG. 11 includes divided band changing section 502 in addition to the components of base station apparatus 100 explained in Embodiment 1.

A feature of the base station apparatus of this embodiment is to change the bandwidths of the divided bands according to a spreading factor for a user channel subjected to code division multiplexing.

Divided band changing section 502 changes the bandwidths of the divided band according to a spreading factor of a user channel subjected to code division multiplexing. That is, when the qth user channel is spread in the frequency axis direction with spreading code sequence Sq(s) of spreading factor SF(q) (that is, when a transmission data sequence is spread using SF(q) subcarrier signals), a group of subcarrier signals used in the spreading processing is considered as one divided band. Thus, since the bandwidth of a divided band is changed according to spreading factor SF(q), the number of the divided bands Nd(q) in the communication band is variable.

Figure 12:
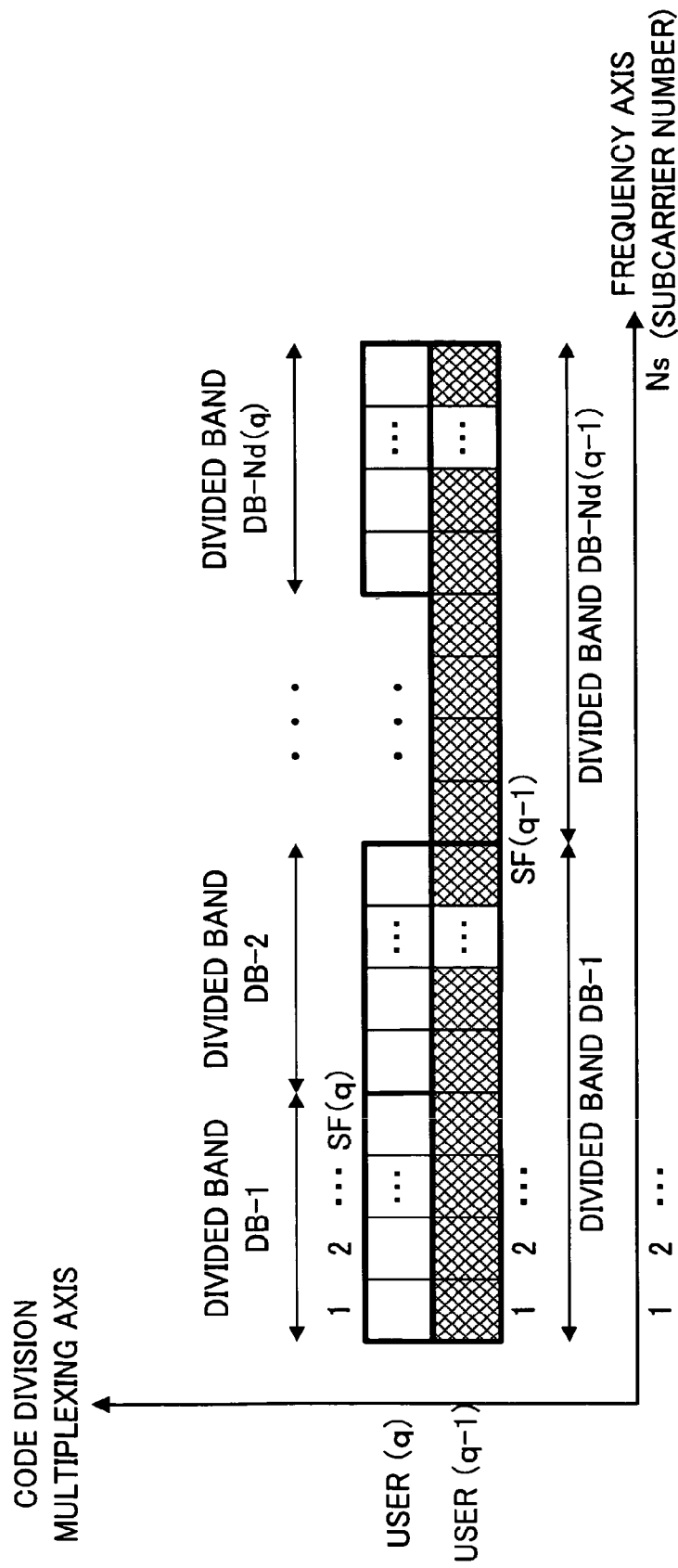
FIG. 12 illustrates a relationship between divided bands and subcarrier signals according to Embodiment 5 of the present invention.

Here, the relationship between the divided bands and subcarrier signals is as shown in FIG. 12. The Ns subcarrier signals on the frequency axis are divided into Nd(q) divided bands according to spreading factors SF(q) of user channels. Nc=SF(q) subcarrier signals exist in each divided band.

Though similar operations and effects can also be obtained even when the number of subcarrier signals in each divided band is assumed to be w×SF(q) (w: natural number), this embodiment will be explained assuming w=1.

Furthermore, divided band changing section 502 assigns divided bands DB-m whose bandwidths have been changed (m=1 to Nd(q) in this embodiment) to Nd(q) divided band processing sections 156-$m$ in space multiplexing adaptability detection section 108.

Thus, this embodiment changes the bandwidth (number of subcarrier signals) of a divided band according to the spreading factor of users to a plurality of user channels that are code division multiplexed in the frequency axis direction and therefore it is possible to detect space multiplexing adaptability for each channel to be spread and transmitted.

The feature of base station apparatus 500 explained in this embodiment may also be applied to base station apparatus 200 explained in Embodiment 2. Since base station apparatus 200 sets a transmission format for each of the divided bands, applying the feature of this embodiment makes it possible to set an optimum transmission format for each of the channels to be spread and transmitted and carry out optimum space multiplexing transmission for each channel. In this case, when the mobile station apparatus receives space multiplexed data, it is possible to perform reception processing in units of spreading symbols (or an integer multiple thereof).

Furthermore, the feature of base station apparatus 500 explained in this embodiment may also be applied to base station apparatus 300 explained in Embodiment 3. In this case, operations and effects similar to those described above can be realized.

Furthermore, this embodiment explained the transmission scheme in which a multicarrier signal is spread in the frequency axis direction as an example but the present invention is also applicable to a transmission scheme in which a multicarrier signal is spread in both the frequency axis and time axis directions. Under such a transmission scheme, spreading factor SF(q) of the qth user can be expressed as the product of spreading factor $SF_f(q)$ in the frequency axis direction and spreading factor $SF_t(q)$ in the time axis direction as shown in (Equation 23). For this reason, when this transmission scheme is applied to base station apparatus 500, similar operations and effects can be realized by changing the bandwidths of the divided bands based on spreading factor $SF_+(q)$ in the frequency axis direction.

$$SF(q) = SF_f(q) \times SF_t(q)$$ Equation 23

Furthermore, in this embodiment, it is also possible to use a technique of calculating a correlation matrix without using any pilot signal as explained in Embodiment 1 using (Equation 13).

The present application is based on Japanese Patent Application No. 2003-280557 filed on Jul. 28, 2003, and Japanese Patent Application No. 2004-213588 filed on Jul. 21, 2004, the entire contents of which are expressly incorporated by reference herein.

INDUSTRIAL APPLICABILITY

The radio communication apparatus and radio communication method according to the present invention have the effect of alleviating a burden in setting a transmission format and suppressing increases in the scale of the apparatus, and are suitable for use in a digital radio communication system using a multicarrier scheme.

The invention claimed is:

1. An integrated circuit for communicating with a reception apparatus using a plurality of divided frequency bands in a communication band, the communication band being divided into the plurality of divided frequency bands and each divided frequency band including a plurality of subcarriers, the integrated circuit comprising:
a generation section configured to control generation of information per divided frequency band according to a format including information on a spatial multiplexing number and information on a spatial multiplexing weight for use in a spatial multiplexing transmission with the reception apparatus; and
a transmission section configured to control transmission of the generated information to the reception apparatus.

2. The integrated circuit according to claim 1, wherein the format further includes one or more of information on a modulation scheme and information on a coding rate.

3. The integrated circuit according to claim 1, further comprising:
a detection section configured to control detection of a reception quality of a signal transmitted from the reception apparatus per divided frequency band, wherein
the generation section controls generation of the information per divided frequency band according to the format based on the detected reception quality per divided frequency band.

4. The integrated circuit according to claim 1, wherein the format is set in accordance with the spatial multiplexing number of the spatial multiplexing transmission with the reception apparatus.

5. An integrated circuit for communicating with a transmission apparatus using a plurality of divided bands in a communication band, the communication band being divided into the plurality of divided bands and each of the plurality of divided bands including a plurality of subcarriers, the integrated circuit comprising:
a transmission section configured to control transmission of a signal to the transmission apparatus, the signal being for use by the transmission apparatus to set a format; and
a reception section configured to control reception of information per divided band, according to the format including information on a spatial multiplexing number and information on a spatial multiplexing weight for use in a spatial multiplexing transmission with the transmission apparatus, wherein one format corresponds to one divided band of the plurality of divided bands.

6. The integrated circuit according to claim 5, further comprising:
a detection section configured to control detection of a reception quality of a received signal transmitted from the transmission apparatus, wherein
the transmission section is further configured to control transmission of an indication of the reception quality of the received signal to the transmission apparatus for use in setting the format.

7. The integrated circuit according to claim 5, wherein the format is set by the transmission apparatus in accordance with the spatial multiplexing number of the spatial multiplexing transmission with the transmission apparatus.

* * * * *